United States Patent [19]

Kato et al.

[11] Patent Number: 5,001,750

[45] Date of Patent: Mar. 19, 1991

[54] SECRET COMMUNICATION CONTROL APPARATUS

[75] Inventors: Hideharu Kato; Yoshihiro Naruse, both of Chiba; Yoshifumi Iwata, Aichi, all of Japan

[73] Assignee: Aisin Seiki Kabushiki Kaisha, Aichi, Japan

[21] Appl. No.: 489,634

[22] Filed: Mar. 7, 1990

[30] Foreign Application Priority Data

Mar. 7, 1989 [JP] Japan ............................ 1-054340

[51] Int. Cl.⁵ ............................................. H04N 1/32
[52] U.S. Cl. .................................. 380/18; 380/9; 380/10; 380/20; 380/49; 380/55
[58] Field of Search ............... 380/9, 10, 18, 20, 49, 380/50, 55

[56] References Cited

U.S. PATENT DOCUMENTS 3,647,949 3/1972 Closs et al. ................. 380/18 X

Primary Examiner—Stephen C. Buczinski
Assistant Examiner—Bernarr Earl Gregory
Attorney, Agent, or Firm—Sughrue, Mion, Zinn, Macpeak & Seas

[57] ABSTRACT

A secret communication control apparatus used to effect secret communication with communication equipment, for example, facsimile equipment, which transmits picture information by use of public communication lines. When a communication control code that is utilized to set a communication mode is to be transmitted, the intervention of the secret communication control apparatus in the communication is suspended by switching a change-over switch, so that the main body of the local communication equipment and the remote communication equipment perform direct transmission of the communication control code therebetween without passing it through the secret communication control apparatus. It is therefore possible to transmit the signal in the minimized time, that is, in the same way as in the case of ordinary, nonsecret communication.

3 Claims, 30 Drawing Sheets

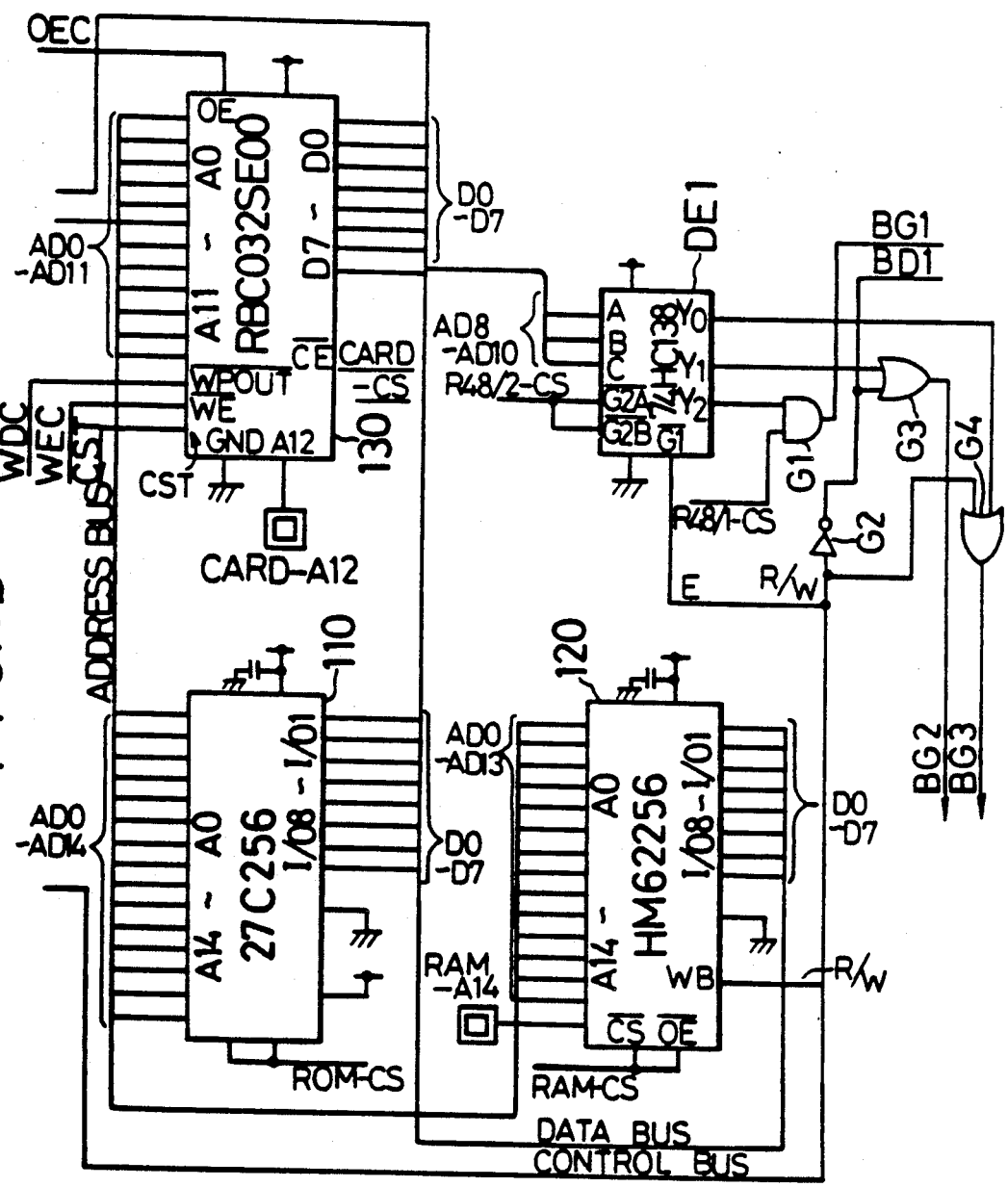

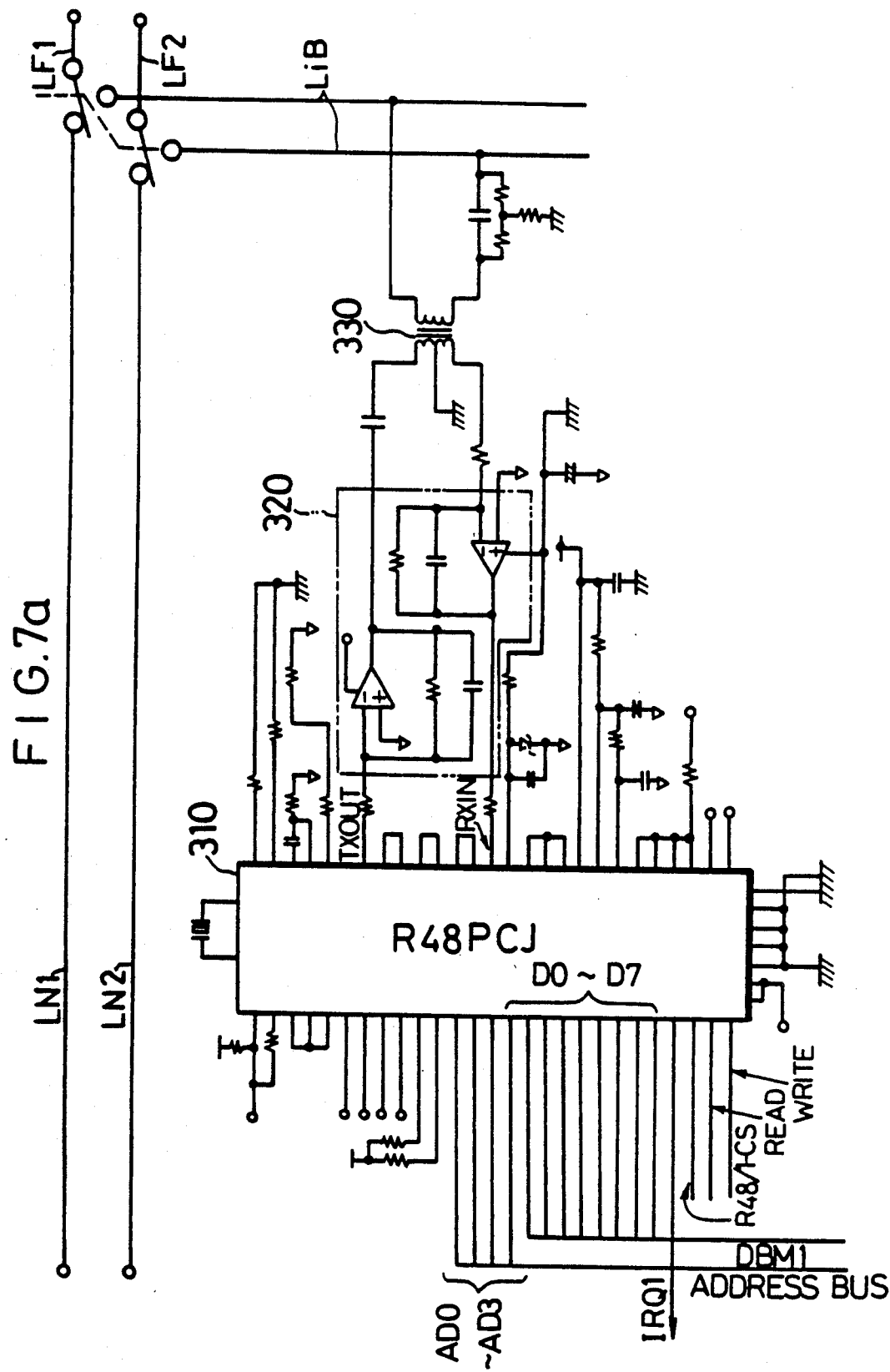

FIG.9

SECRET COMMUNICATION CONTROL APPARATUS

BACKGROUND OF THE INVENTION

1. Field of the Invention

The present invention relates to a secret communication control apparatus which may be used to effect secret communication with communication equipment, for example, facsimile equipment, which transmits picture information by use of public communication lines. More particularly, the present invention pertains to an appendant secret communication control apparatus which is independent of the main body of communication equipment and which enables secret communication by intervening in the communication performed by the communication equipment.

2. Description of the Related Art

A variety of means for encryption and decryption of information for secret communication have heretofore been proposed, and facsimile equipment having a secret communication control function has also been known, for example, Japanese Patent Laid-Open Publication (KOKAI) No. 59-221167 (1984).

The apparatus disclosed in Japanese Patent Laid-Open Publication (KOKAI) No. 59-221167 (1984) has a structure in which a secret communication control funtion is built in facsimile equipment or a secret communication control device is externally connected to facsimile equipment through a predetermined interface. To automatically discriminate between facsimile equipments with and without the secret communication control function, information concerning the secret communication control function is added to the signal NSF (Non-Standard Function) that is defined as an optional function in the communication control procedures recommended by CCITT.

The above-described apparatus, however, involves the problem that, since the secret communication control function discrimination is effected by use of the signal NSF that is not standardized, it is only possible to utilize as remote communication equipments a limited number of equipments that perform the same processing in regard to the secret communication control function discriminating signal, that is, the same type of equipment as the local communication equipment.

Since the secret communication control means is built in or added to the facsimile equipment itself, conventional facsimile equipment cannot be utilized as it is but must be modified or changed in design in order to provide it with the secret communication control means.

Under these circumstances, the present inventor has already invented a secret communication control apparatus designed to be inserted in communication lines (public communication lines) connecting together the facsimile equipment and the exchanger, and filed an application for a patent. Since this secret communication control apparatus performs encryption and decryption of messages for secret communication by intervening between two facsimile equipments, it is possible to effect secret communication by use of conventional facsimile equipments with no secret communication control function. Moreover, since the secret communication control apparatus is inserted in communication lines, it can be completely separated from the main body of the facsimile equipment and can therefore be concealed from a third party.

The conventional secret communication control apparatus of the type described above suffers, however, from the disadvantage that secret communication needs a longer time than ordinay, nonsecret communication.

More specifically, the prior art needs to relay through the secret communication control apparatus all of the various signals and control codes transmitted between two facsimile equipments and consequently, when information is sent from one facsimile equipment to another, it is necessary to effect signal transmission in each of the three communication systems, that is, those between the sending facsimile equipment and the first secret communication control apparatus interposed in the sending line, between the receiving facsimile equipment and the second secret communication control apparatus interposed in the receiving line and between the first and second secret communication control apparatuses. Accordingly, the time required for secret communication is three times that in the case of ordinary communication, even on simple calculation.

Since processing of communication messages, for example, picture data, is relatively simple, encryption and decryption of such data can be executed virtually in a real-time manner and it is therefore possible to simultaneously effect reception and transmission of the data and hence prevent the transmission time from lengthening. However, processing of communication control procedures is so complicated that it is impossible to simultaneously effect reception and transmission of communication control codes, and transmission of communication control codes unavoidably requires a period of time which is three times that in the case of ordinary communication. When a communication error or other trouble occurs, the time required for secret communication further lengthens.

SUMMARY OF THE INVENTION

It is a primary object of the present invention to provide a secret communication control apparatus of the type in which secret communication is enabled by intervention in the communication between the main body of local communication equipment and the remote communication equipment, the apparatus being designed so that it is possible to minimize the time required for secret communication and make it closer to the time required for ordinary communication.

To this end, the present invention provides a secret communication control apparatus comprising: a first set of signal lines connected to remote communication means; first modulator-demodulator means connected to the first set of signal lines for demodulating a signal appearing on the signal lines and modulating a signal applied to a modulation input terminal and outputting the modulated signal to the signal lines; a second set of signal lines connected to local communication means; a third set of signal lines; second modulator-demodulator means connected to the third set of signal lines for demodulating a signal appearing on the third set of signal lines and modulating a signal applied to a modulation input terminal and outputting the modulated signal to the third set of signal lines; secret information processing means for deciphering the signal demodulated by the first modulator-demodulator means and applying the deciphered signal to the modulation input terminal of the second modulator-demodulator means and further enciphering the signal demodulated by the second modulator-demodulator means and applying the enciphered signal to the modulation input terminal of the first modulator-demodulator means; change-over switching means for selectively connecting the second set of signal lines to either one of the first and third sets of signal lines; and electronic control means for monitoring signals appearing on the first or second set of signal lines and effecting control such that, when at least key information and message information are to be transmitted, the control means sets the change-over switching means in a first position for intervention in the communication between the first and second sets of signal lines, whereas, when at least a communication control code which is utilized to set a communication mode is to be transmitted, the control means sets the change-over switching means in a second position for suspending the intervention in the communication between the first and second sets of signal lines.

By virtue of the above-described arrangement of the present invention, when a communication control code that is utilized to set a communication mode is to be transmitted, the intervention of the secret communication control apparatus in the communication is suspended by switching the change-over switching means, so that the main body of the local communication equipment and the remote communication equipment perform direct transmission of the communication control code therebetween without passing it through the secret communication control apparatus. Accordingly, in such a case, communication between the local secret communication control apparatus and the main body of the local communication equipment and communication between the remote secret communication control apparatus and the remote communication equipment are omitted and it is therefore possible to transmit the signal in the minimized time, that is, in the same way as in the case of ordinary, nonsecret communication.

When communication key information and message information are to be transmitted, the change-over switching means is automatically switched so that the secret communication control apparatus intervenes in the communication to encipher information to be transmitted and decipher received information by the secret information processing means provided in the secret communication control apparatus, thus effecting secret communication. Since encryption and decryption are relatively simple processings, each signal can be inputted and outputted substantially simultaneously; therefore, even when the secret communication control apparatus intervenes in the communication in order to effect encryption and decryption, the time required for secret communication is approximately the same as in the case where the secret communication control apparatus does not intervene in the communication. Thus, it is possible according to the present invention to minimize the time required for secret communication and make it closer to the time required for ordinary communication.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which:

FIGS. 5a to 10 are block diagrams respectively showing in detail the arrangements of various portions of the arrangement shown in FIG. 3;

DESCRIPTION OF THE PREFERRED EMBODIMENTS

The present invention will be described below in detail with reference to the accompanying drawings.

Figure 1:
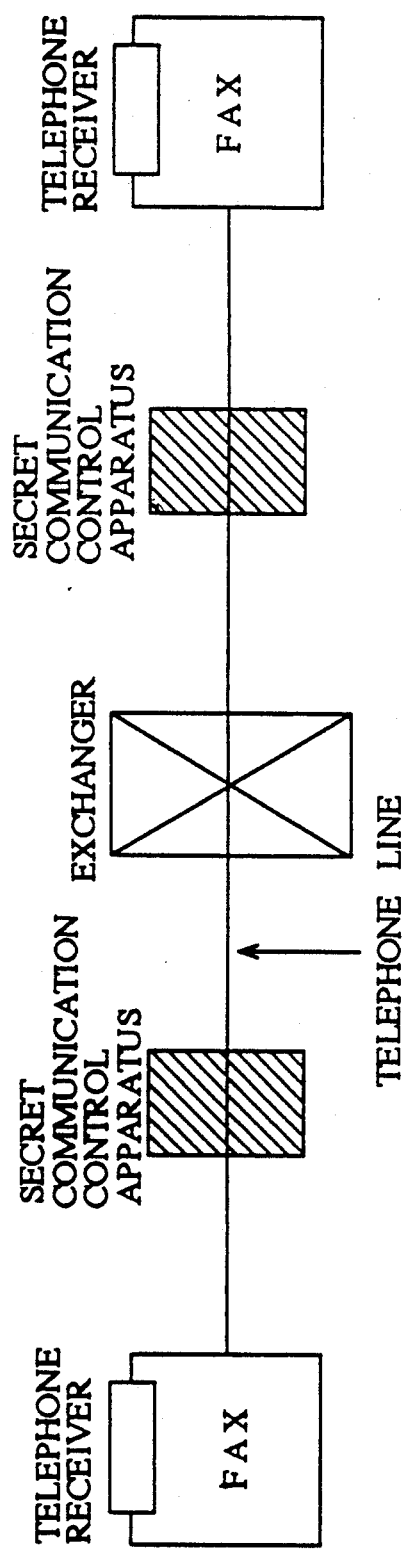
FIG. 1 is a block diagram showing the general arrangement of a communication system that utilizes one embodiment of the secret communication control apparatus according to the present invention.

Referring to FIG. 1, which shows the general arrangement of a communication system which uses one embodiment of the secret communication control apparatus according to the present invention to effect facsimile communication, two facsimile equipments (FAX's) which communicate with each other are connected to public telephone lines through which they are connected to an exchanger, and the secret communication control apparatus according to the present invention is interposed between each facsimile equipment connected to the telephone lines and the exchanger. Each facsimile equipment shown in the figure is a commercially available one that has the G3 mode defined by CCITT, which has not been remodeled at all. In other words, it is possible to effect secret communication by use of an existing facsimile equipment simply by interposing in telephone lines a secret communication control apparatus according to the embodiment of the present invention.

Figure 2:
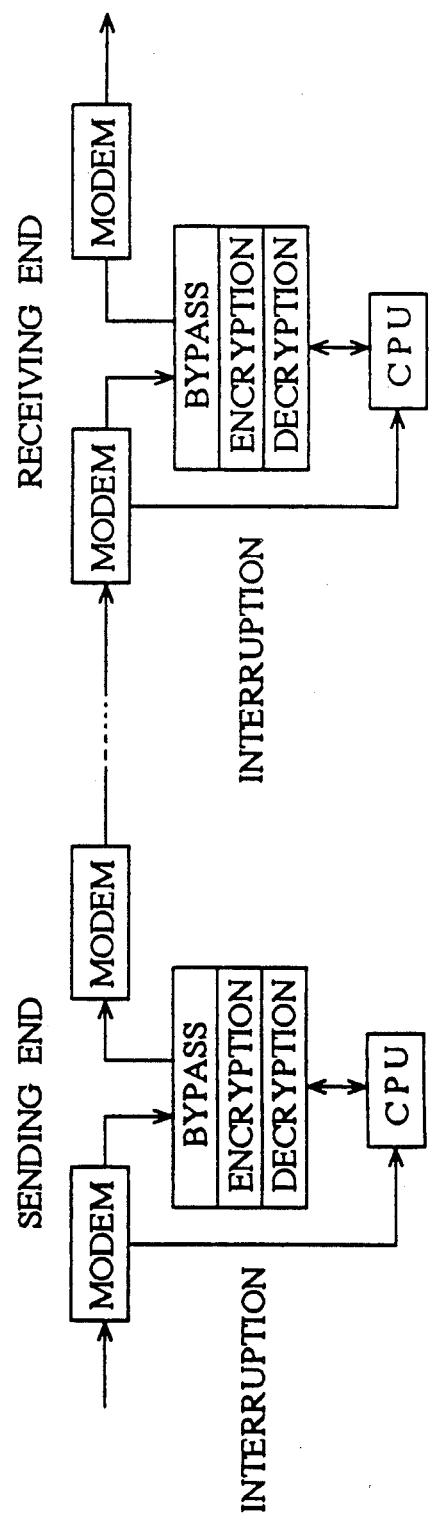
FIG. 2 is a block diagram schematically showing the arrangement of the secret communication control apparatus provided at each of the sending and receiving ends.

FIG. 2 schematically shows the arrangement of the secret communication control apparatus provided at each of the sending and receiving ends. Referring to FIG. 2, the secret communication control apparatuses provided respectively at the sending and receiving ends have the same arrangement. More specifically, each secret communication control apparatus comprises two modems (modulator-demodulators), a control unit (CPU) and a unit having signal bypassing, enciphering and deciphering functions.

To effect secret communication, picture information sent to the telephone lines from the facsimile equipment at the sending end is inputted to the associated secret communication control apparatus through one modem to obtain enciphered information, which is then sent to the telephone lines through the other modem. At the receiving end, the enciphered information appearing on the telephone lines is inputted through one modem and deciphered to regenerate the transmitted picture information, which is then sent to the receiving facsimile equipment through the other modem. Thus, although each facsimile equipment merely performs an ordinary operation, the information transmitted through the telephone lines between the two secret communication control apparatuses is in the form of an enciphered signal, thus secret communication being effected.

Figure 3:
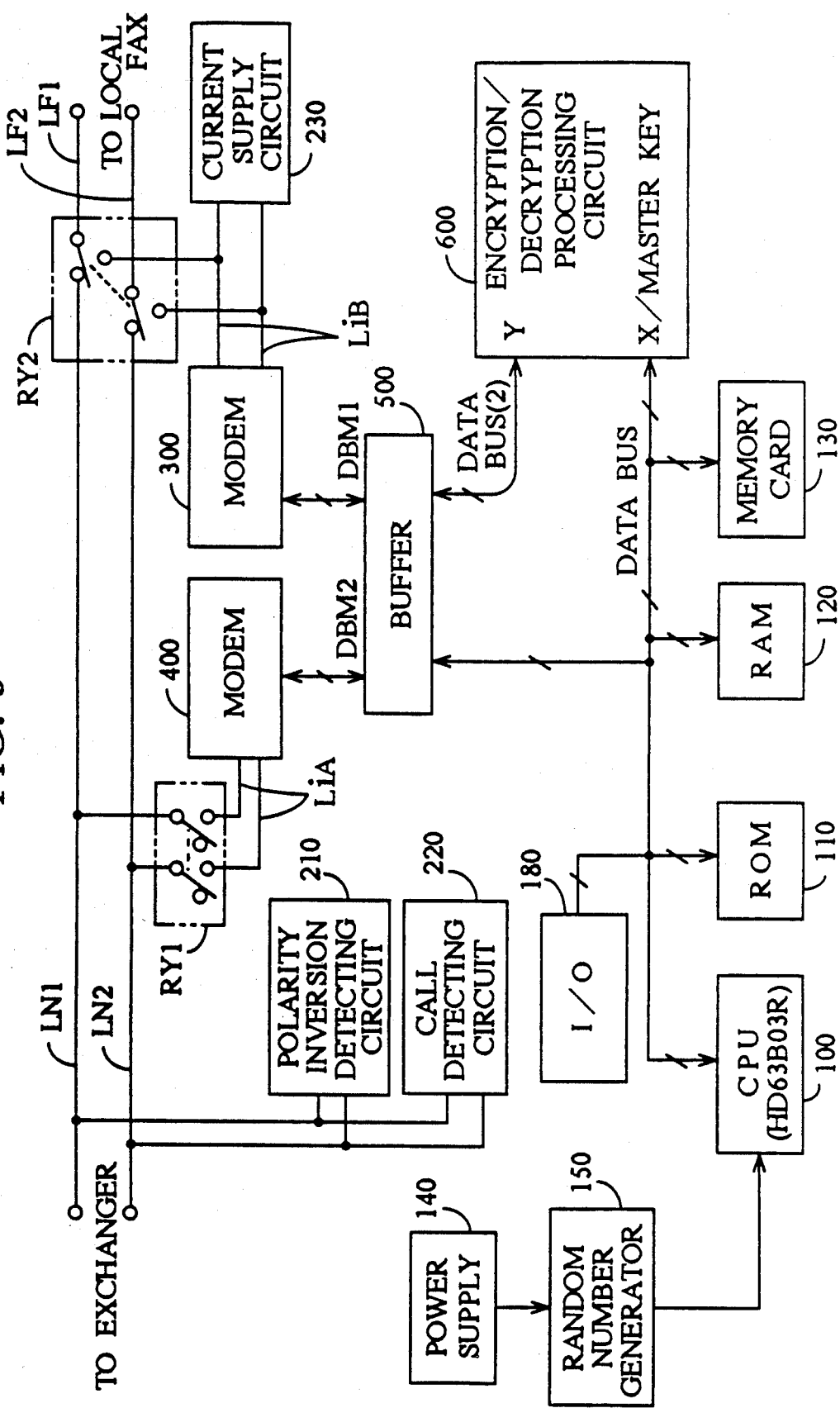
FIG. 3 is a block diagram showing the arrangement of one embodiment of the secret communication control apparatus according to the present invention.

The arrangement of one embodiment of the secret communication control apparatus according to the present invention will next be explained with reference to FIG. 3. A relay RY2 is interposed between public telephone lines LN1 and LN2 which are connected to an exchanger and lines LF1 and LF2 which are connected to a local facsimile equipment. The lines LF1 and LF2 connected to the local facsimile equipment are connected to respective common contacts of the relay RY2, while the telephone lines LN1 and LN2 are connected to respective first contacts of the relay RY2. To the other, or second, contacts of the relay RY2 are respectively connected internal lines LiB provided inside the secret communication control apparatus. In this embodiment, when the relay RY2 is off, the lines LN1, LN2 and the lines LF1, LF2 are respectively connected to each other, whereas, when the relay RY2 is on, the lines LF1, LF2 and the internal lines LiB are respectively connected to each other.

Further, the telephone lines LN1 and LN2 are connected to respective internal lines LiA provided inside the secret communication control apparatus through respective normally-open contacts of a relay RY1. In addition, a polarity inversion detecting circuit 210 and a call detecting circuit 220 are connected to the telephone lines LN1 and LN2, and a current supply circuit 230 is connected to the internal lines LiB.

The secret communication control apparatus further comprises the following constituent elements, that is, a microcomputer (CPU) 100, a ROM 110, a RAM 120, a memory card 130, a power supply 140, a random number generator 150, an input/output interface (I/O) 180, modems 300, 400, a buffer 500 and an encryption/decryption processing circuit 600.

Each of the modems 300 and 400 has a communication function based on V27ter, i.e., specification G3, defined by CCITT.

The data bus of the microcomputer 100 is connected to both the respective data buses DBM1 and DBM2 of the two modems 300 and 400 via the buffer 500. Accordingly, the microcomputer 100 is capable of communicating with the local facsimile equipment through the modem 300 and also with a remote facsimile equipment through the modem 400. The buffer 500 and the encryption/decryption processing circuit 600 are connected together through an internal data bus (2). By controlling the buffer 500, the data bus (2) can be selectively connected to either the data bus DBM1 of the modem 300 or the data bus DBM2 of the modem 400.

Accordingly, when, for example, the local facsimile equipment performs transmission, picture information which is to be enciphered is inputted through the internal lines LiB to the modem 300 where it is demodulated. The demodulated signal is supplied to the buffer 500 through the data bus DBM1 and then outputted to the data bus of the microcomputer 100 so as to be applied to the X-group terminals of the encryption/decryption processing circuit 600. The circuit 600 enciphers the data applied to the X-group terminals and outputs the enciphered data to the data bus (2) through the Y-group terminals. The enciphered data is outputted to the data bus DBM2 through the buffer 500. It is then modulated in the modem 400 and sent to the telephone lines LN1 and LN2 through the internal lines LiA.

When the local facsimile equipment performs reception, enciphered picture information which is to be deciphered is inputted through the internal lines LiA to the modem 400 where it is demodulated. The demodulated signal is supplied to the buffer 500 through the data bus DBM2 and then outputted to the data bus (2) so as to be applied to the Y-group terminals of the encryption/decryption processing circuit 600. The circuit 600 deciphers, or decodes, the data applied to the Y-group terminals and outputs the deciphered data to the X-group terminals. The deciphered data is outputted to the data bus DBM1 through the buffer 500 and applied to the modem 300 through the data bus DBM1. The modem 300 demodulates and sends the information to the lines LF1 and LF2 of the local facsimile equipment through the internal lines LiB.

The memory card 130, which is utilized as a kind of key in secret communication, is detachably connected to the secret communication control apparatus by means of a predetermined connector. The memory card 130 incorporates a battery for holding stored information and a read/write memory stored with the ID code of the card 130. In other words, normal secret communication is permitted only when memory cards having the identical ID code are attached to secret communication control apparatuses disposed in the vicinities of the sending and receiving facsimile equipments.

The arrangements of the constituent elements of the apparatus shown in FIG. 3 will be explained below in more detail with reference to FIGS. 5a to 9.

Figure 5A:
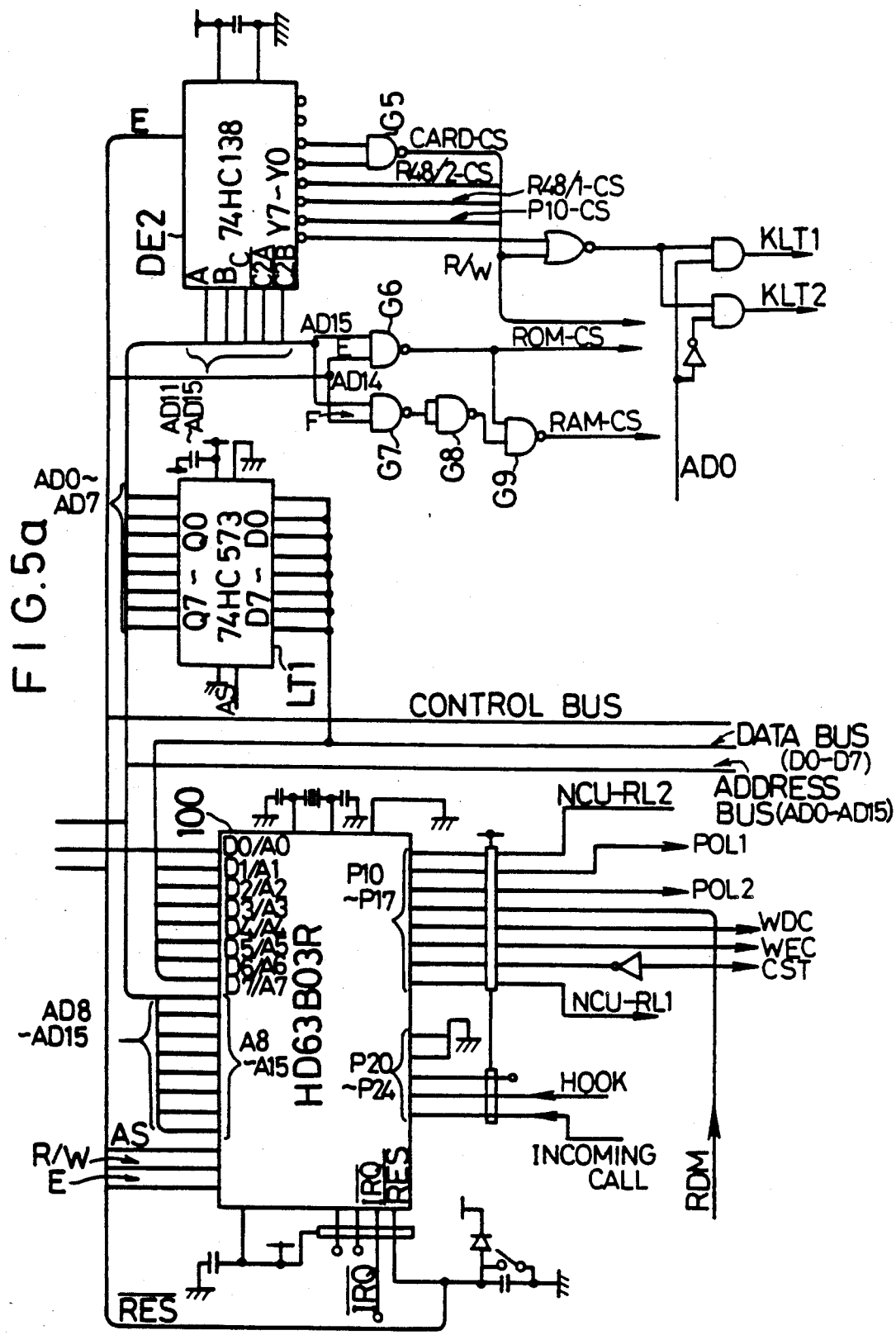

Referring first to FIG. 5a, the illustrated circuit includes the microcomputer 100 and its peripheral circuit elements. The microcomputer 100 herein used is HD63B03R. The latch LT1 functions as an address latch which extracts address information (A7 to A0) carried by low-order 8 bits superposed as being a data bus signal of the microcomputer 100. On the address bus appears a 16-bit signal which comprises high-order 8 bits (AD15 to AD8) outputted directly from the microcomputer 100 and the low-order 8 bits (AD7 to AD0) outputted from the address latch LT1.

Various chip select signals for selecting various peripheral circuits, respectively, which are connected to the microcomputer 100 are generated in an address decoder which comprises a decoder DE2 and various logic gates (G5, G6, G7, G8 and G9). More specifically, when an address which has been assigned to each of the peripheral circuits in advance appears on the address bus, the chip select signal corresponding to the address is decoded and thereby made active.

FIG. 5b shows the ROM 110, the RAM 120 and the memory card 130. These circuits are connected to the microcomputer 100 through the address, data and control buses. The reference symbol DE1 denotes a decoder. It should be noted that the memory card 130 is detachably connected to the secret communication control apparatus by means of a connector (not shown).

Figure 5C:
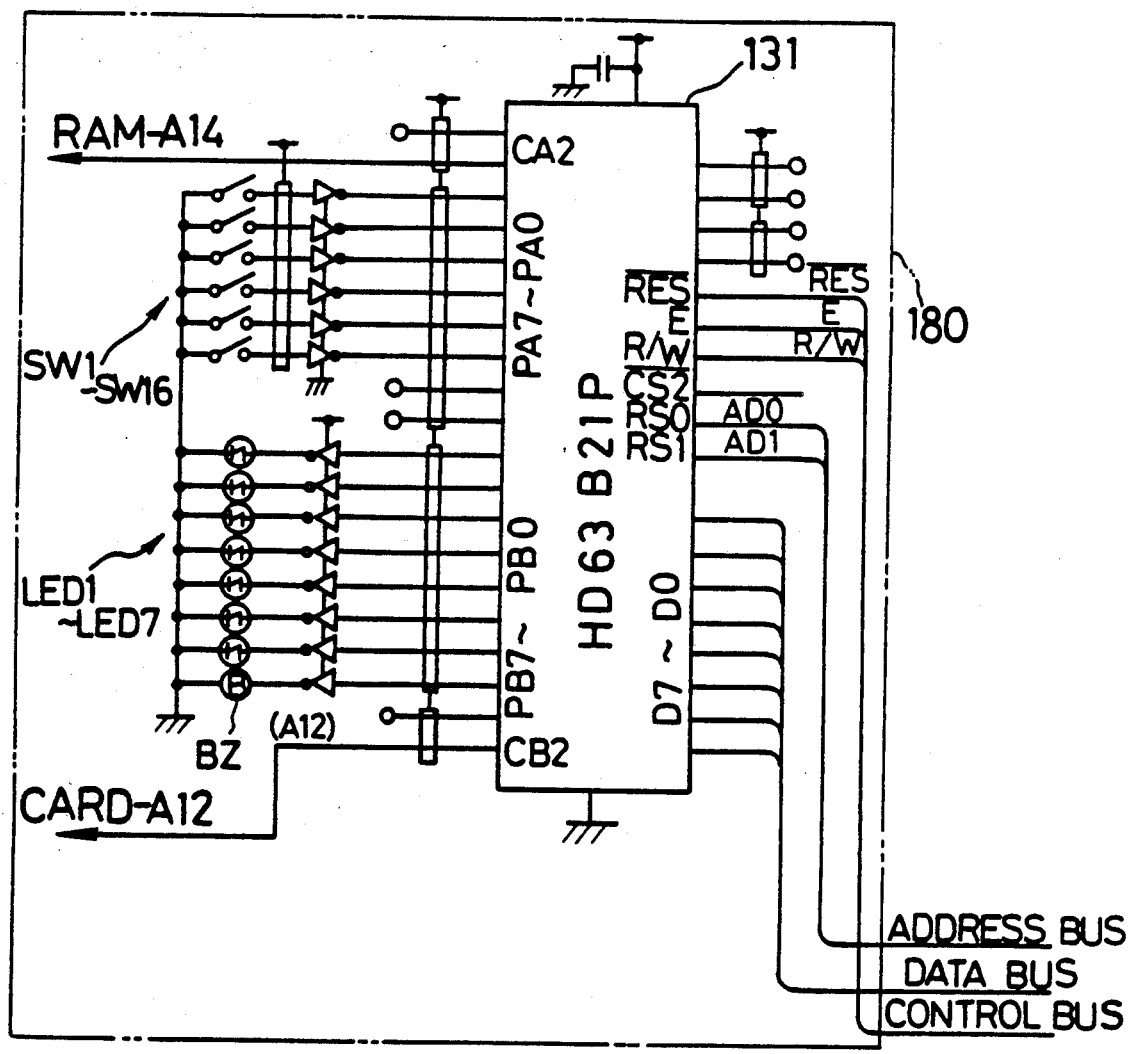

FIG. 5c shows the input/output interface 180. The circuit 180 comprises an integrated circuit 131 connected to the addess, data and control buses of the microcomputer 100 and switches SW1 to SW6, light-emitting diodes LED1 to LED7, a buzzer BZ, a buffer and a driver, which are connected to respective ports of the integrated circuit 131.

Figure 5D:
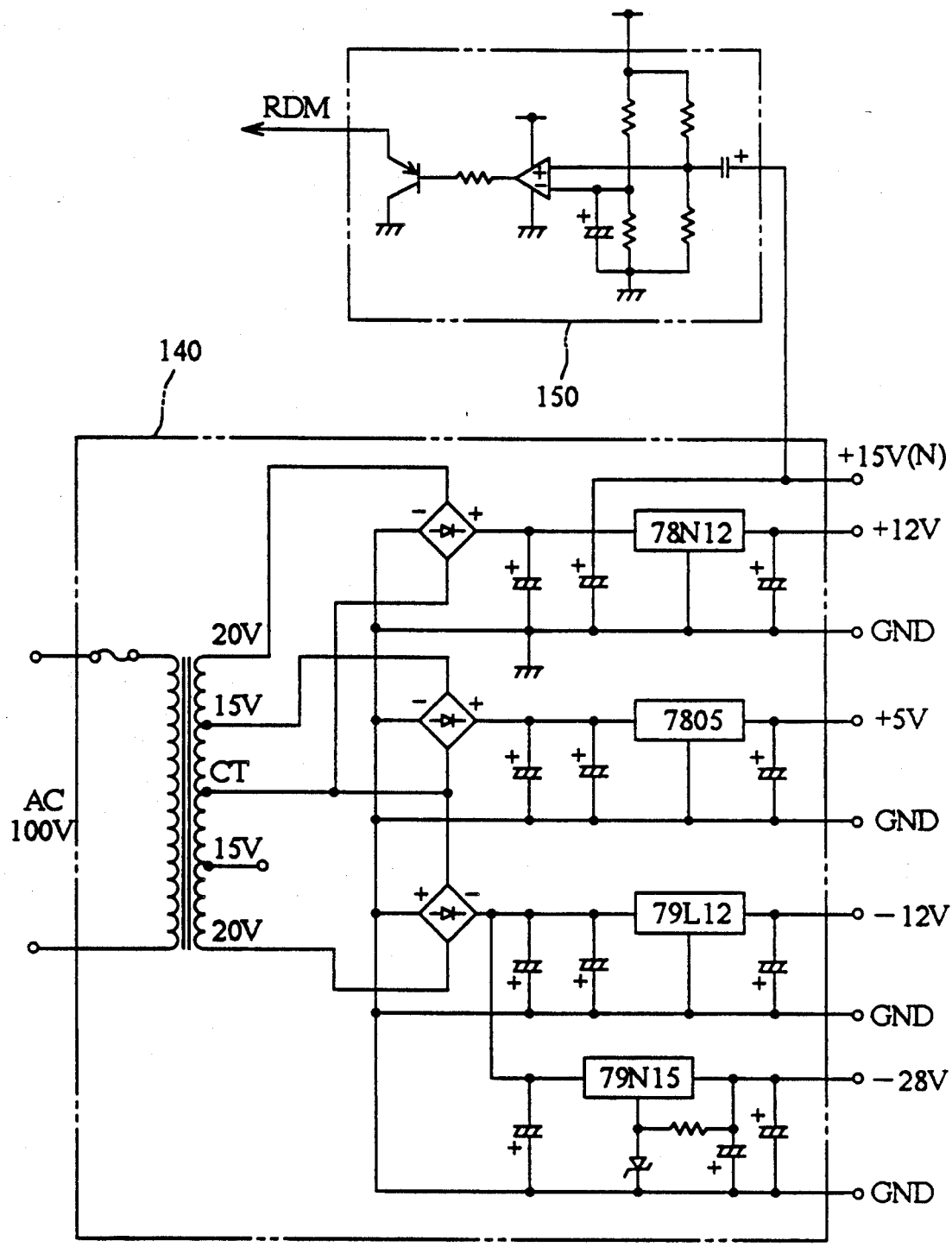

FIG. 5d shows the power supply 140 and the random number generator 150. The power supply 140 has a function to convert power supplied from a commercial AC power source (AC100V) to various DC voltages. The power supply 140 per se has no particularly novel arrangement.

On the other hand, the random number generator 150 constitutes an analog voltage comparator. One of the two comparison input terminals is supplied with a stabilized voltage, and the other comparison input terminal is supplied with a pulsating voltage outputted from the power supply 140. The pulsating voltage, which is formed by smoothing an AC (50Hz) after full-wave rectification, exhibits regularly recurring fine variations of magnitude and includes various noises undesirably entering the power supply line. The threshold value of the analog voltage comparator is set at a median level in the range within which the pulsating signal level changes.

Thus, a recurrent small pulse signal RDM appears at the output terminal of the comparator. By sequentially sampling the signal RDM; approximately random number data can be obtained, although it depends on the samping period. In this embodiment, the random number data produced in this way is utilized as a key code when secret communication is performed.

Figure 6A:
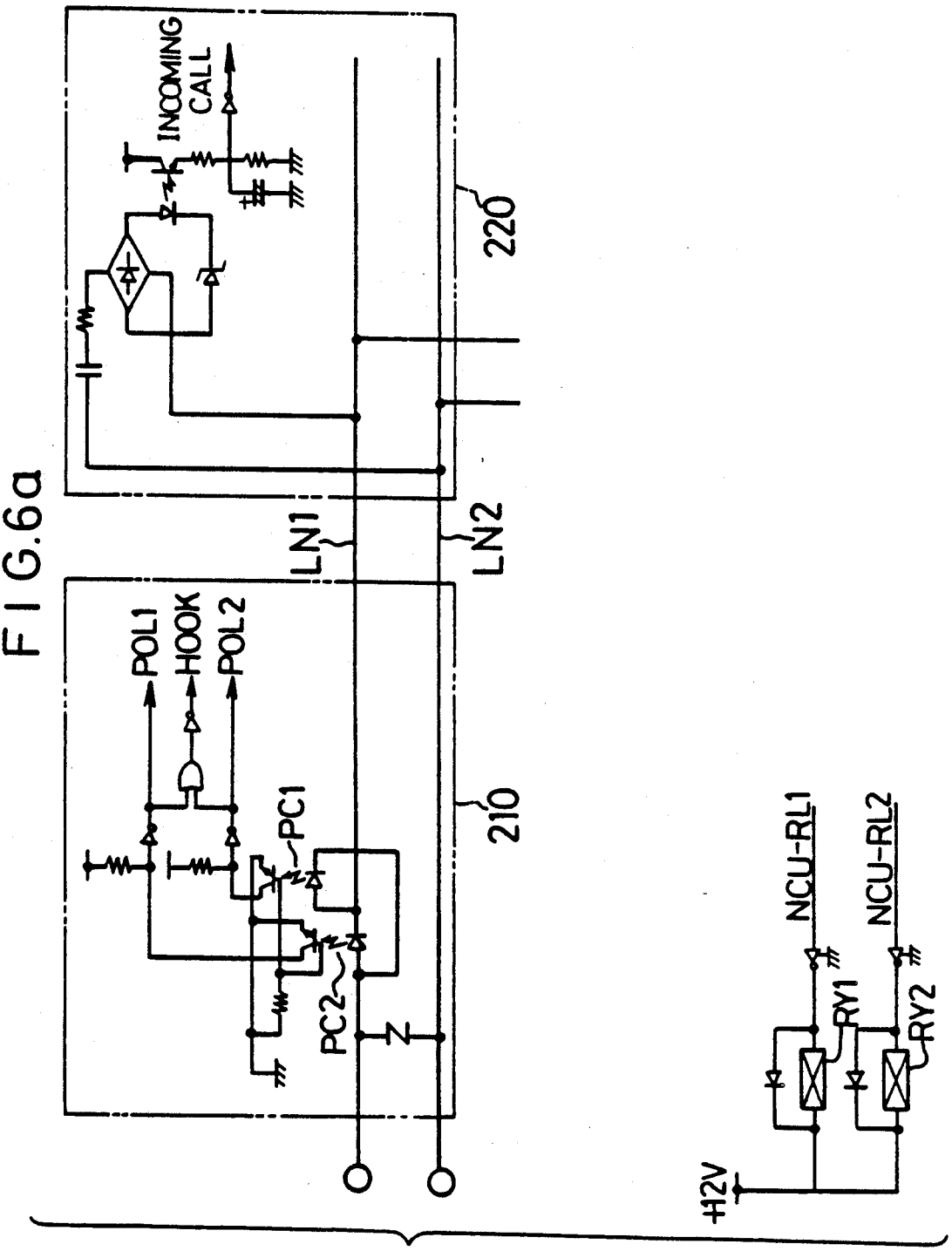

FIG. 6a shows the polarity inversion detecting circuit 210, the call detecting circuit 220 and the relays RY1 and RY2. The relays RY1 and RY2 are ON/OFF controlled by signals NCU-RL1 and NCU-RL2, respectiely, which are outputted from the microcomputer 100.

The polarity inversion detecting circuit 210 judges whether or not a current is flowing through the telephone lines LN1 and LN2, and also discriminates between directions of the current when flowing. To detect a current flowing through the line LN1, the circuit 210 is provided with photocouplers PC1 and PC2 each comprising a light-emitting diode and a phototransistor. The light-emitting diodes of the two photocouplers PC1 and PC 2 are interposed in the line LN1 in opposite relation to each other in terms of the polarity. Accordingly, when a current flows in one direction, the photocoupler PC1 turns on, while the photocoupler PC2 turns off, whereas, when a current flows in the other direction, the photocoupler PC1 turns off, while the photocoupler PC2 turns on. When no current flows, both the photocouplers PC1 and PC2 are off.

In the telephone lines, when the hook-switch of a telephone receiver is on, no current flows through the lines, whereas, when the hook-switch turns off, a current flows through the telephone lines. Accordingly, this embodiment is arranged such that the hook-off signal is active when a current is flowing in either direction. Two signals POL1 and POL2 are turned on/off in accordance with the direction of the current flowing through the telephone lines LN1 and LN2. The polarity of the voltage on the telephone lines LN1 and LN2 is inverted by the exchanger; therefore, in order to detect the polarity of the voltage on the telephone lines LN1 and LN2, the polarity inversion detecting function is provided. This function is utilized when the local facsimile equipment is cut off from the lines LN1 and LN2 and connected to the associated secret communication control apparatus to make the polarity of the voltage supplied to the lines LF1 and LF2 of the local facsimile equipment coincident with the polarity of the voltage on the telephone lines LN1 and LN2.

The call detecting circuit 220 has a function to detect a call signal appearing on the telephone lines LN1 and LN2. Since the call signal is an AC signal, the call detecting circuit 220 is arranged such that a signal obtained by cutting off the DC component by means of a capacitor is rectified through a full-wave rectifier and, when a signal higher than a predetermined level appears in the rectification output, the incoming call signal turns on.

Figure 6B:
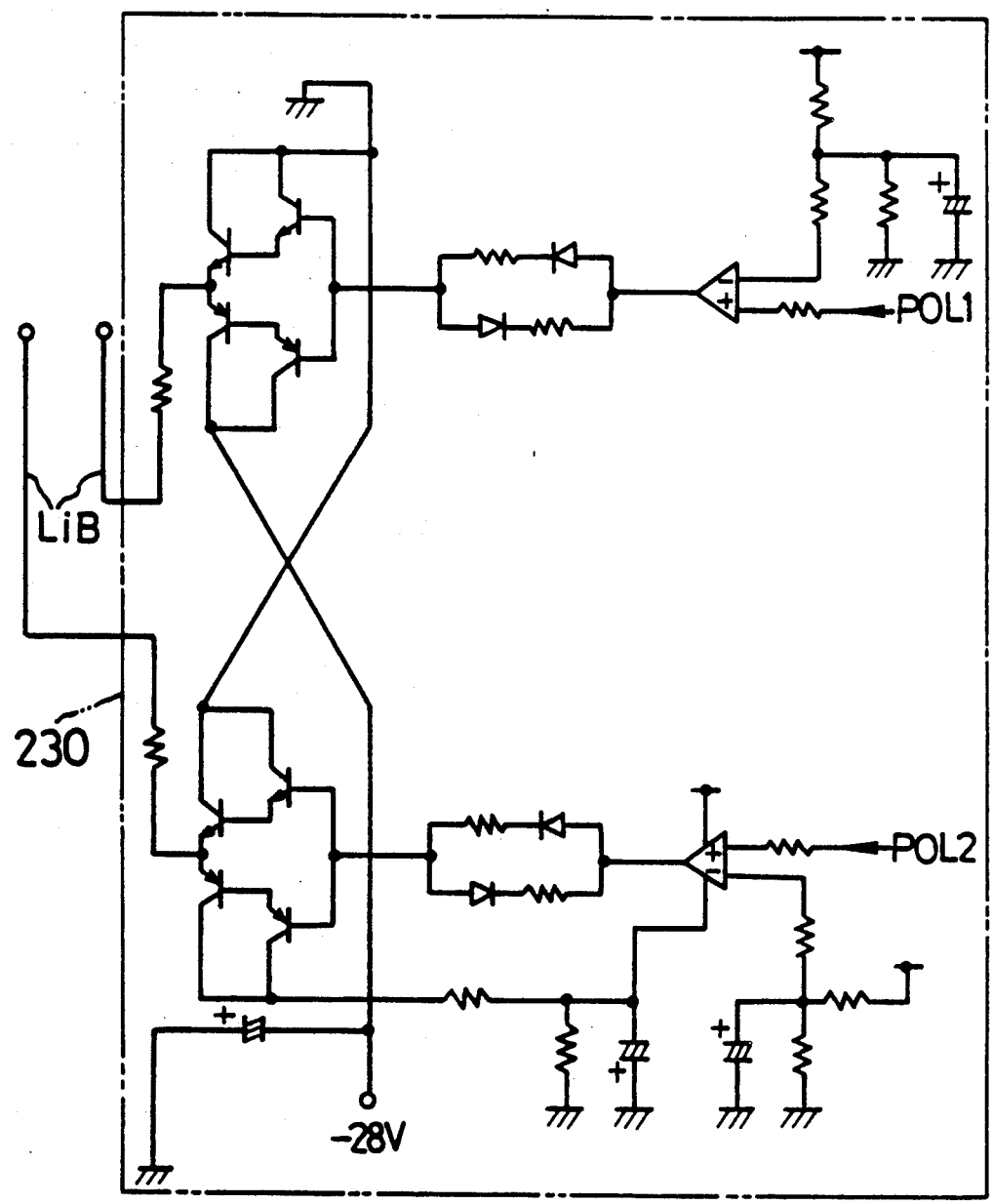

FIG. 6b shows the current supply circuit 230. The circuit 230 has a function to supply a voltage to the lines LF1 and LF2 of the local facsimile equipment when cut off from the telephone lines LN1 and LN2 and connected to the lines LiB of the secret communication control apparatus. To make the polarity of the voltage coincident with the polarity of the voltage on the telephone lines LN1 and LN2, this circuit 230 utilizes the polarity signals POL1 and POL2 outputted from the above-described polarity inversion detecting circuit 210.

Accordingly, even if an existing facsimile equipment monitors the voltage and current on the lines to which the equipment is connected to effect control in accordance with the conditions of the voltage and current, the connection of the lines of this facsimile equipment can be switched from the telephone lines to the secret communication control apparatus without any problem. It should be noted that, although a voltage of 48 V normally appears on the telephone lines LN1 and LN2, the current supply circuit 230 supplies a voltage of 28 V.

FIG. 7a shows the modem 300. The greater part of the circuit constituting this modem comprises a single-chip integrated circuit (R48PCJ) 310. The integrated circuit 310 has functions based on V27ter specified by CCITT. The integrated circuit 310 has the following basic functions: the function to convert digital signals applied to the data terminals (D7 to D0) into a serial signal, modulate and output it to a serial transmission output terminal TXOUT; and the function to demodulate and convert a serial signal applied to a serial reception input terminal RXIN into parallel data and then output it to the data terminals (D7 to D0).

The signal outputted from the serial transmission output terminal TXOUT of the integrated circuit 310 is passed through a signal processing circuit 320 and then outputted to the lines LiB through a transformer 330. The signal inputted from the lines LiB is passed through the transformer 330 and the signal processing circuit 320 and applied to the serial reception input terminal RXIN. The data terminals (D7 to D0) of the integrated circuit 310 are connected to the data bus DBM1.

Figure 7B:
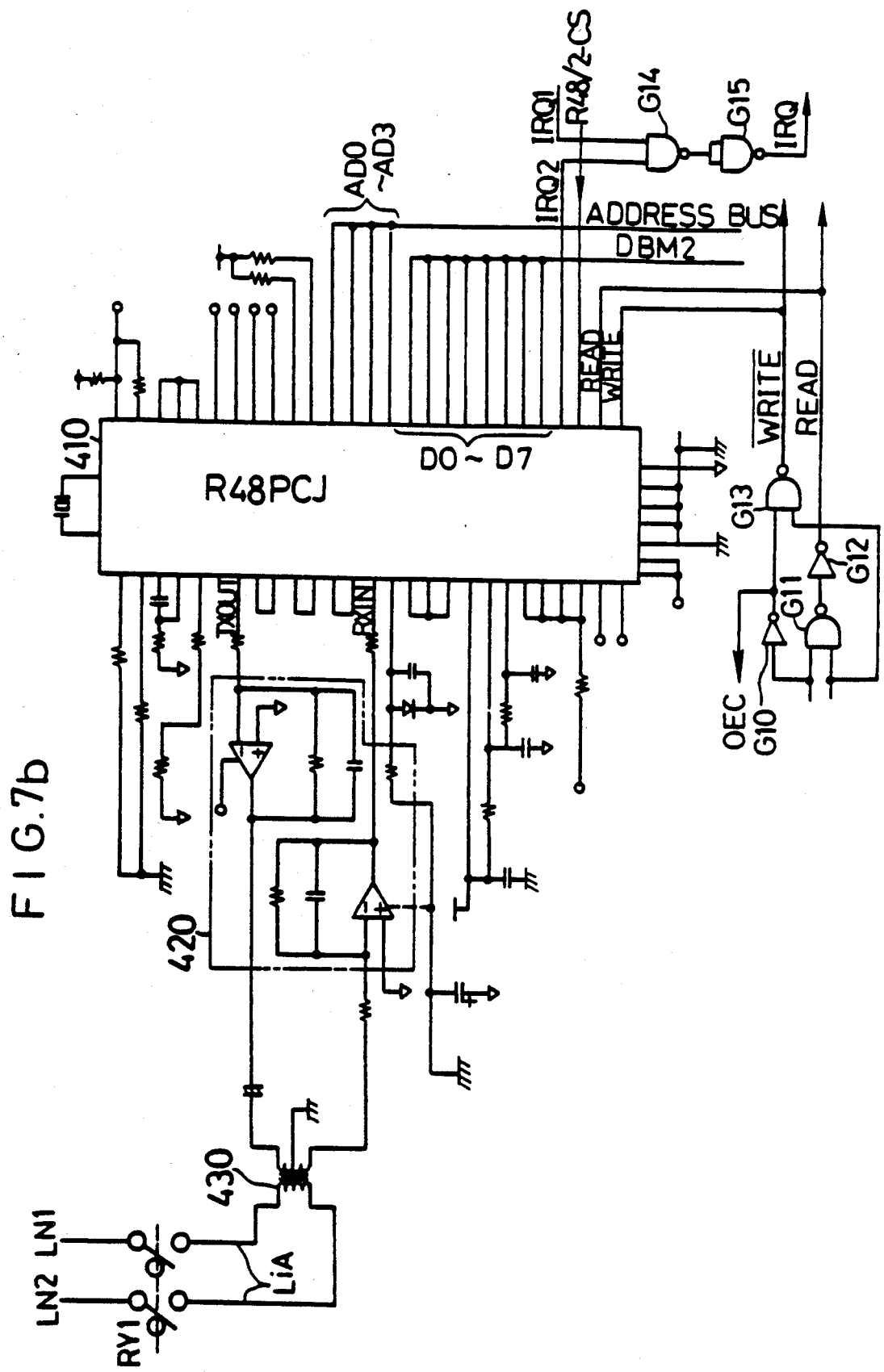

FIG. 7b shows the modem 400. The greater part of the circuit constituting this modem comprises a single-chip integrated circuit 410. The arrangement of the integrated circuit 410 is the same as that of the above-described integrated circuit 310. The signal outputted from the serial transmission output terminal TXOUT of the integrated circuit 410 is passed through a signal processing circuit 420 and then outputted to the lines LiA through a transformer 430. The signal inputted from the lines LiA is passed through the transformer 430 and the signal processing circuit 420 and applied to the serial reception input terminal RXIN of the integrated circuit 410. The data terminals (D7 to D0) of the integrated circuit 410 are connected to the data bus DBM2.

In addition, the logical sum (OR) of an interrupt request signal IRQ1 outputted from the modem 300 shown in FIG. 7a and an interrupt request signal IRQ2 outputted from the modem 400 shown in FIG. 7b is outputted from a logic gate G15 and applied to an interrupt request input terminal INT of the microcomputer 100.

Figure 8:
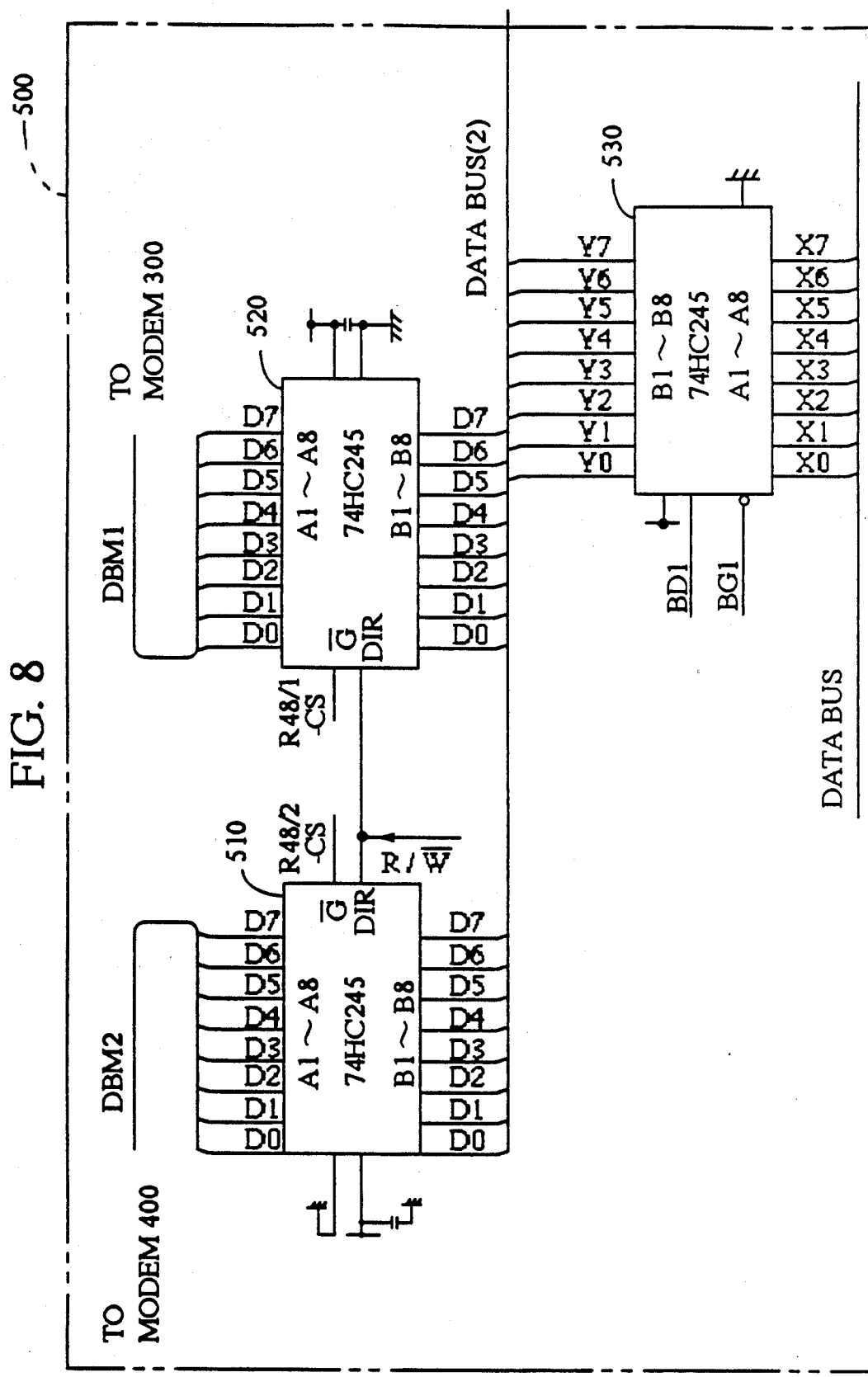

FIG. 8 shows the buffer 500. The buffer 500 comprises integrated circuits (74HC245) 510, 520 and 530 each functioning as a bidirectional three-state bus buffer. The A-group terminals of the integrated circuit 510 are connected to the data bus DBM2 of the modem 400; the A-group terminals of the integrated circuit 520 are connected to the data bus DBM1 of the modem 300; and the A-group terminals of the integrated circuit 530 are connected to the data bus of the microcomputer 100. The respective B-group terminals of the integrated circuits 510, 520 and 530 are mutually connected to the internal data bus (2).

Accordingly, by controlling the integrated circuits 510 and 530, data can be transmitted in any direction between the three, that is, the data bus of the microcomputer 100, the internal data bus (2) and the data bus DBM2 of the modem 400, and by controlling the integrated circuits 520 and 530, data can be transmitted in any direction between the three, that is, the data bus of the microcomputer 100, the internal data bus (2) and the data bus DBM1 of the modem 300.

Figure 9:
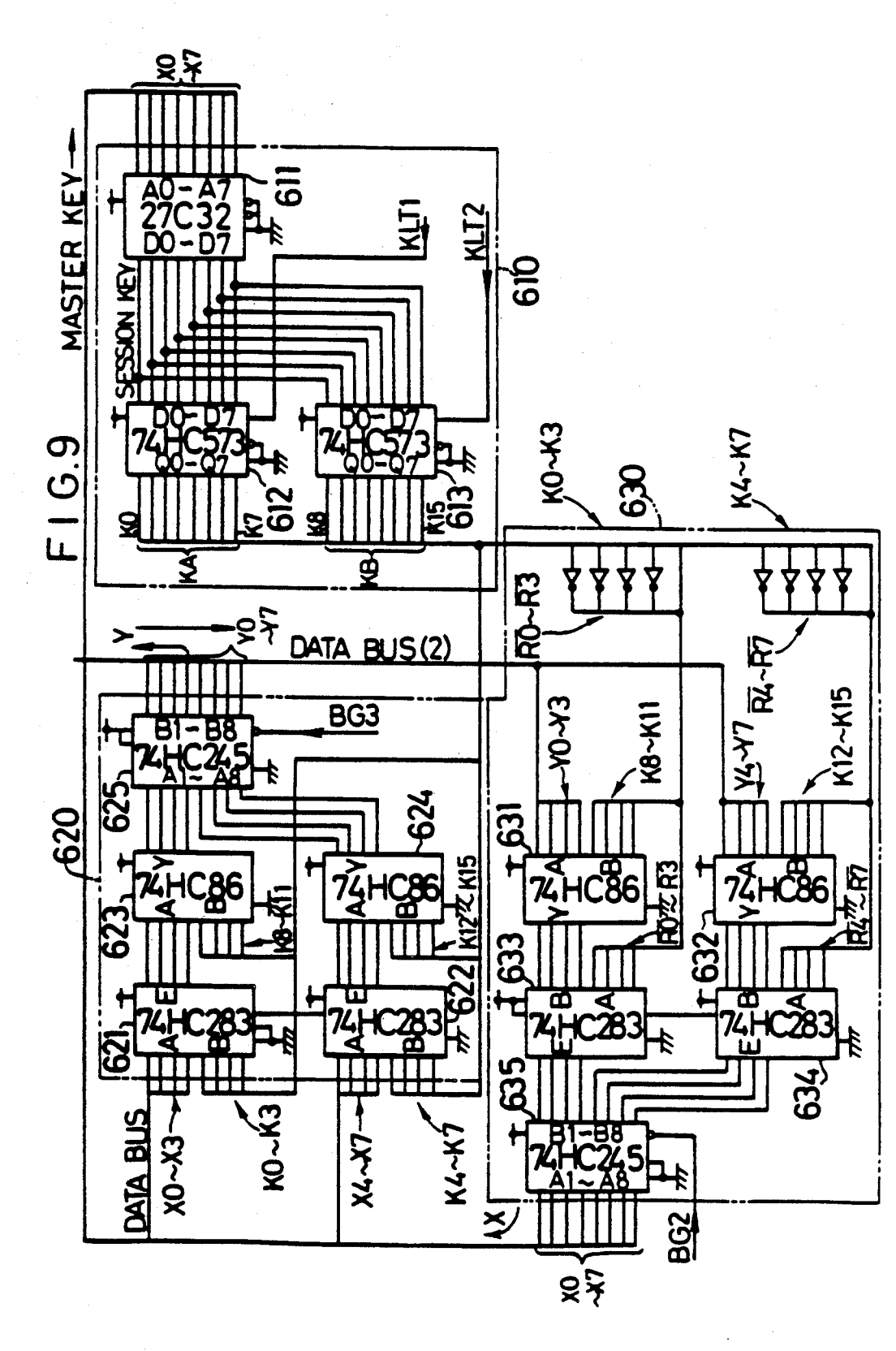

FIG. 9 shows specifically the arrangement of the encryption/decryption processing circuit 600. The circuit 600 mainly comprises a key code holding circuit 610, an encryption circuit 620 and a decryption circuit 630.

The key code holding circuit 610 comprises a PROM (programmable ROM) 611 and two latches 612 and 613. To the address terminals (A0 to A7) of the PROM 611 are applied master key information from the microcomputer 100. The PROM 611 has different key codes stored at respective addresses in advance. When supplied with address information, the PROM 611 outputs to the data terminals (D0 to D7) an 8-bit key code stored at the address indicated by the address information.

Information outputted from the PROM 611 can be held in the latches 612 and 613 by controlling latch control signals KLT1 and KLT2, respectively. Data held in the latch 612 and data held in the latch 613 are made different from each other by making the master key applied to the PROM 611 when the latch control signal KLT1 is outputted different from the master key applied to the PROM 611 when the latch control signal KLT2 is outputted. The 8-bit data held in the latch 612 is applied to the encryption circuit 620 as being a key code KA, and the 8-bit data held in the latch 613 is applied to the decryption circuit 630 as being a key code KB.

The encryption circuit 620 comprises 4-bit full adders 621, 622, exclusive-OR circuits 623, 624 and a three-state output buffer 625. The A-group input terminals of the full adder 621 are supplied through the data bus with the low-order 4 bits (X0 to X3) of information X which is to be enciphered, and the B-group input terminals of the full adder 621 are supplied with the low-order 4 bits (K0 to K3) of the key code KA. The A-group input terminals of the full adder 622 are supplied through the data bus with the high-order 4 bits (X4 to X7) of the information X to be enciphered, and the B-group input terminals of the full adder 622 are supplied with the high-order 4 fits (K4 to K7) of the key code KA. The carry output of the full adder 621 is applied to the input terminal of the full adder 622.

The signals outputted from the E-group output terminals of the full adders 621 and 622 are applied to the respective A-group input terminals of the exclusive-OR circuits 623 and 624. To the B-group input terminals of the exclusive-OR circuit 623 are applied the low-order 4 bits (K8 to K11) of the key code KB, and to the B-group input terminals of the exclusive-OR circuit 624 are applied the high-order 4 bits (K12 to K15) of the key code KB.

The 4-bit signal outputted from the output terminal Y of the exclusive-OR circuit 623 and the 4-bit signal outputted from the output terminal Y of the exclusive-OR circuit 624 are passed through the buffer 625 and outputted to the internal data bus (2) as being 8-bit enciphered information Y.

The decryption circuit 630 comprises 4-bit full adders 633, 634, exclusive-OR circuits 631, 632, a three-state output buffer 635 and a group of inverters. The A-group input terminals of the exclusive-OR circuit 631 are supplied with the low-order 4 bits (Y0 to Y3) of enciphered information Y from the internal data bus (2), while the B-group input terminals of the circuit 631 are supplied with the low-order 4 bits (K8 to K11) of the key code KB. The A-group input terminals of the exclusive-OR circuit 632 are supplied with the high-order 4 bits (Y4 to Y7) of the enciphered information Y from the internal data bus (2), while the B-group input terminals of the circuit 632 are supplied with the high-order 4 bits (K12 to K15) of the key code KB.

The signals outputted from the Y-group output terminals of the exclusive-OR circuits 631 and 632 are applied to the respective B-group input terminals of the full adders 633 and 634. The A-group input terminals of the full adder 633 are respectively supplied with signals obtained by inverting the low-order 4 bits (K0 to K3) of the key code KA, while the A-group input terminals of the full adder 634 are respectively supplied with signals obtained by inverting the high-order 4 bits (K4 to K7) of the key code KA.

The 4-bit information outputted from the full adder 633 and the 4-bit information outputted from the full adder 634 are delivered to the data bus of the microcomputer 100 through the buffer 635 as being deciphered 8-bit information X.

Figure 4:
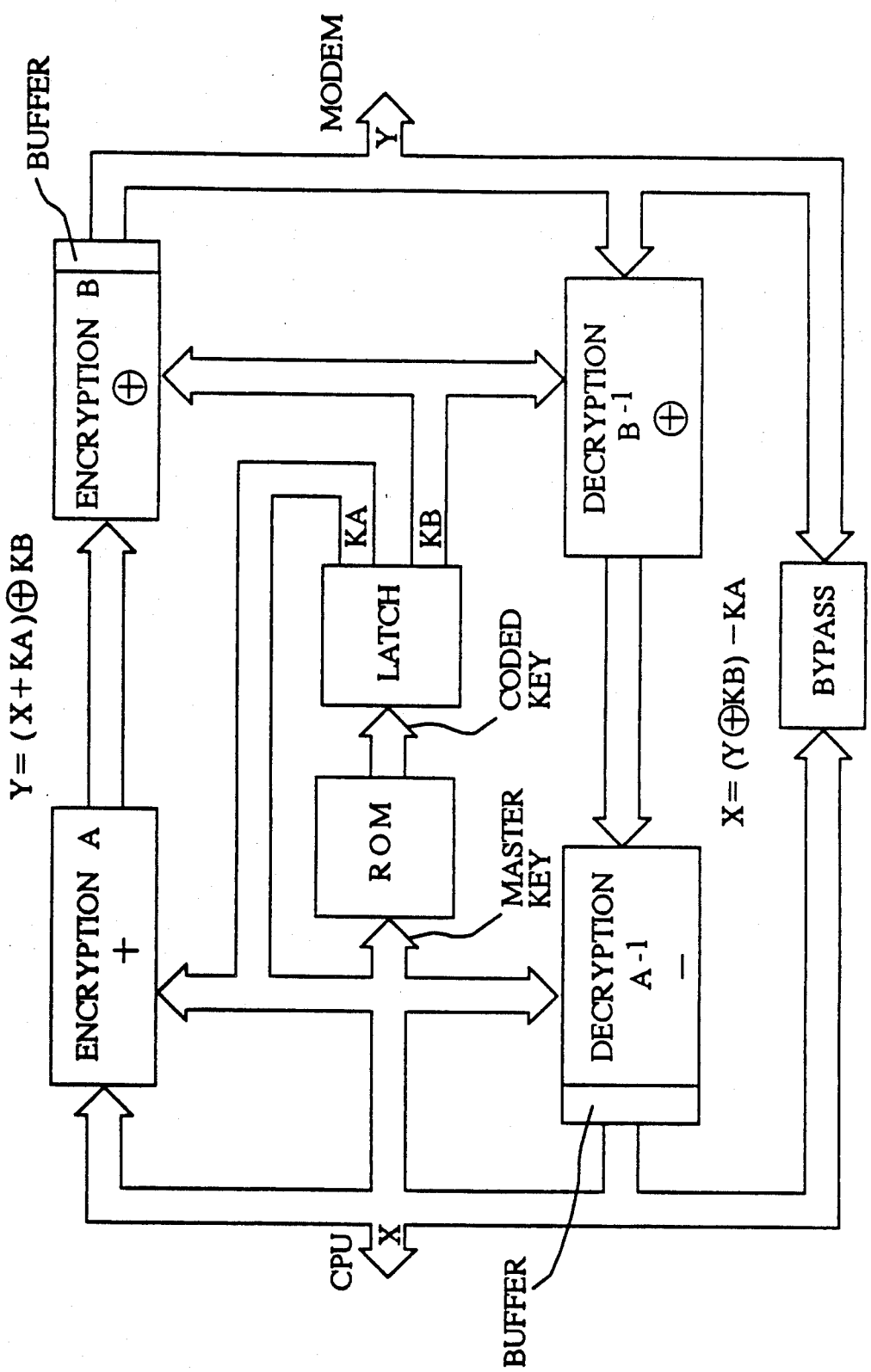
FIG. 4 is a block diagram schematically showing the functions of the encryption/decryption processing circuit employed in the embodiment shown in FIG. 3.

The basic cryptographic processes executed by the encryption and decryption circuits 620 and 630 have heretofore been known and are therefore considered to be unnecessary to explain. For reference, see FIG. 4 which schematically shows the contents of processing executed by the encryption/decryption processing circuit 600 shown in FIG. 9.

Figure 10:
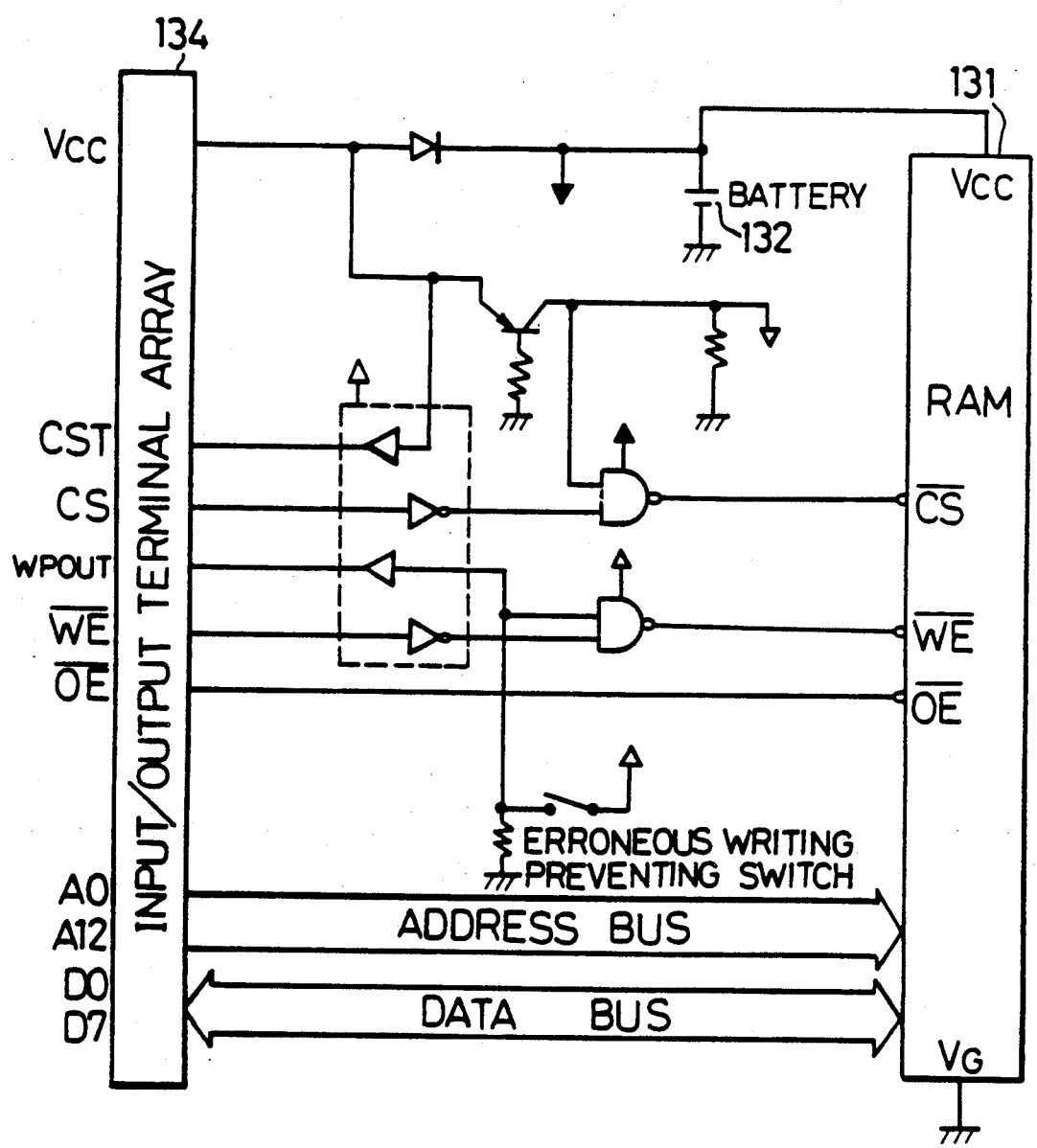

FIG. 10 shows the internal structure of the memory card 130 employed in this embodiment. Referring to FIG. 10, the memory card 130 comprises a read/write memory (RAM) 131, a battery 132, a control circuit and a connector 134 and is detachably connected to the main body of the secret communication control apparatus through the connector 134. The terminals of the connector 134 are assigned respectively a power supply line (Vcc), a card set signal terminal (CST), a chip select signal terminal (CS), a write control output (WPOUT), a write control input ($\overline{WE}$), an output enable input ($\overline{OE}$), an address bus (A0 to A12) and a data bus (D0 to D7). The RAM 131 has been previously stored with an ID code proper (previously assigned) to this memory card 130. To effect secret communication in this embodiment, both the sending and receiving secret communication control apparatuses need to have respective memory cards stored with the idential ID code.

The following is a description of the actual communication operation of the embodiment having the above-described arrangement. FIGS. 11a to 11g show the operations of facsimile equipments which communicate with each other, and FIGS. 12a to 12i show the main part of the operation of the secret communication control apparatus. It should be noted that the contents of the processing executed by each facsimile equipment are the same as those in the case of the conventional facsimile equipment and will therefore be briefly explained.

In the following description of the contents of the processing, the communication system is assumed to be arranged as shown in FIG. 1. Further, in the following description the symbols shown in parentheses which are representative of signals transmitted in the communication processing are those provided on the recommendation of CCITT. In addition, the following description is made on the assumption that both the calling and called facsimile equipments operate in the automatic mode.

Figure 11A:
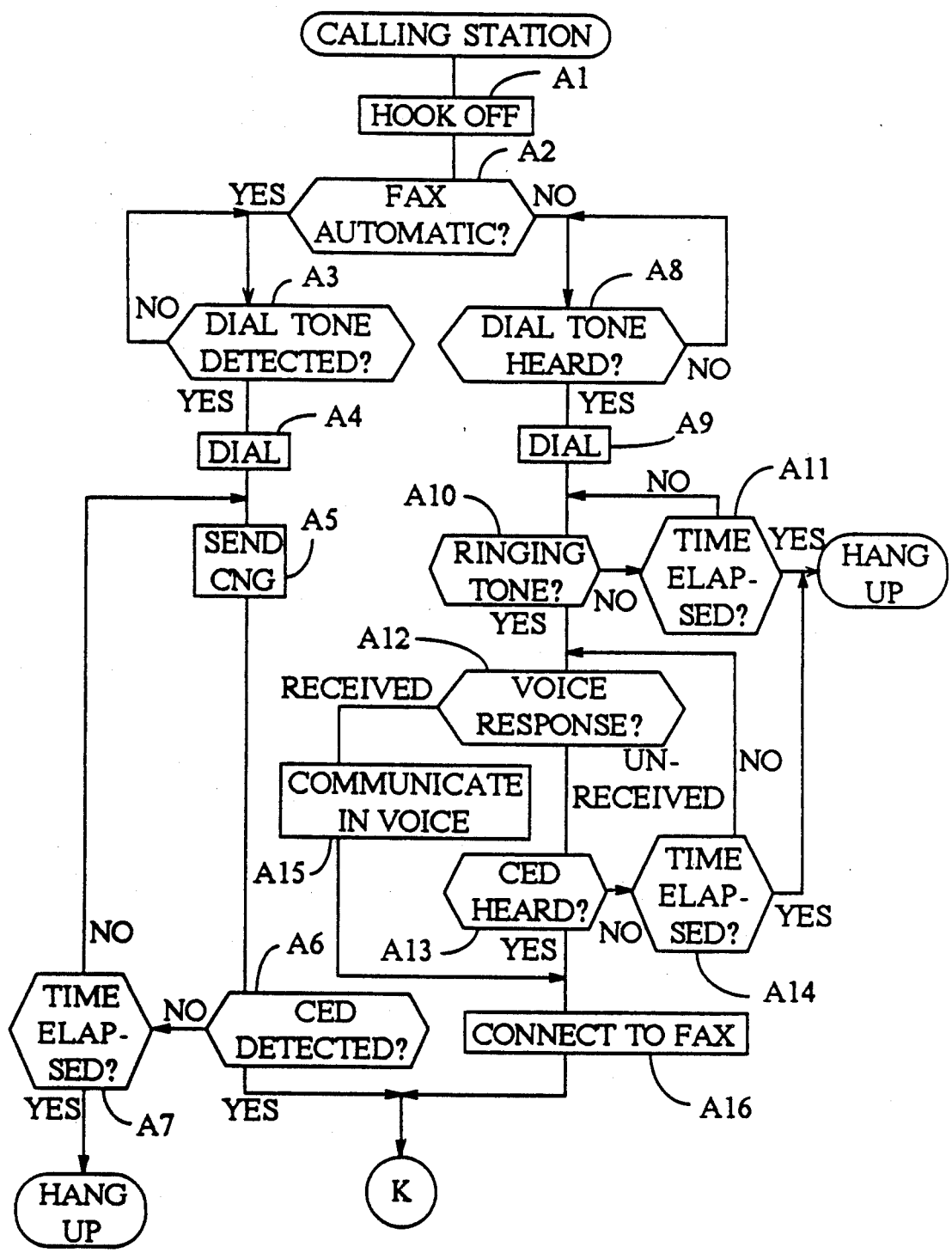
FIGS. 11a to 11g are flowcharts showing the contents of facsimile communication processings.
Figure 11B:
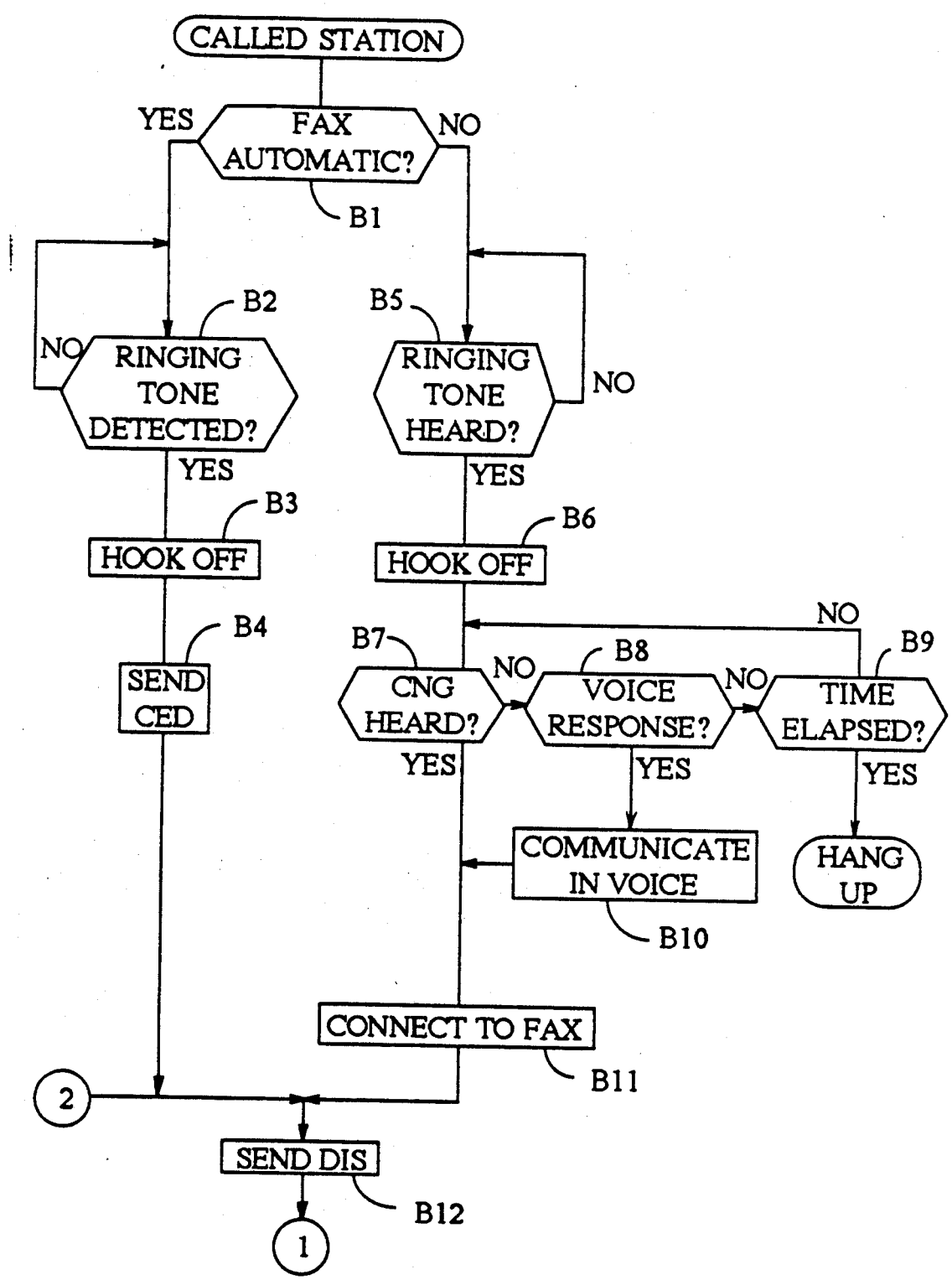
Figure 11C:
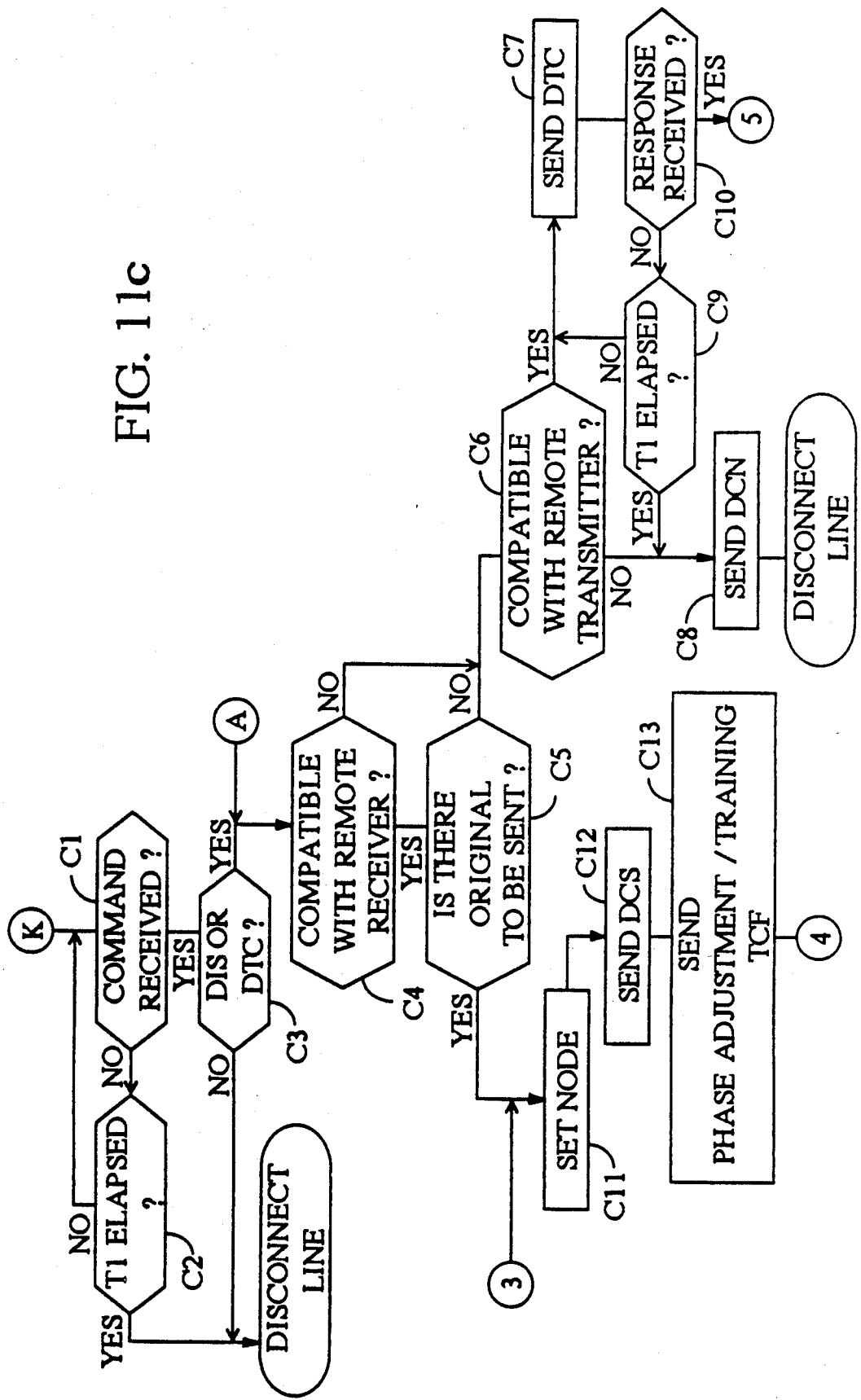
Figure 11D:
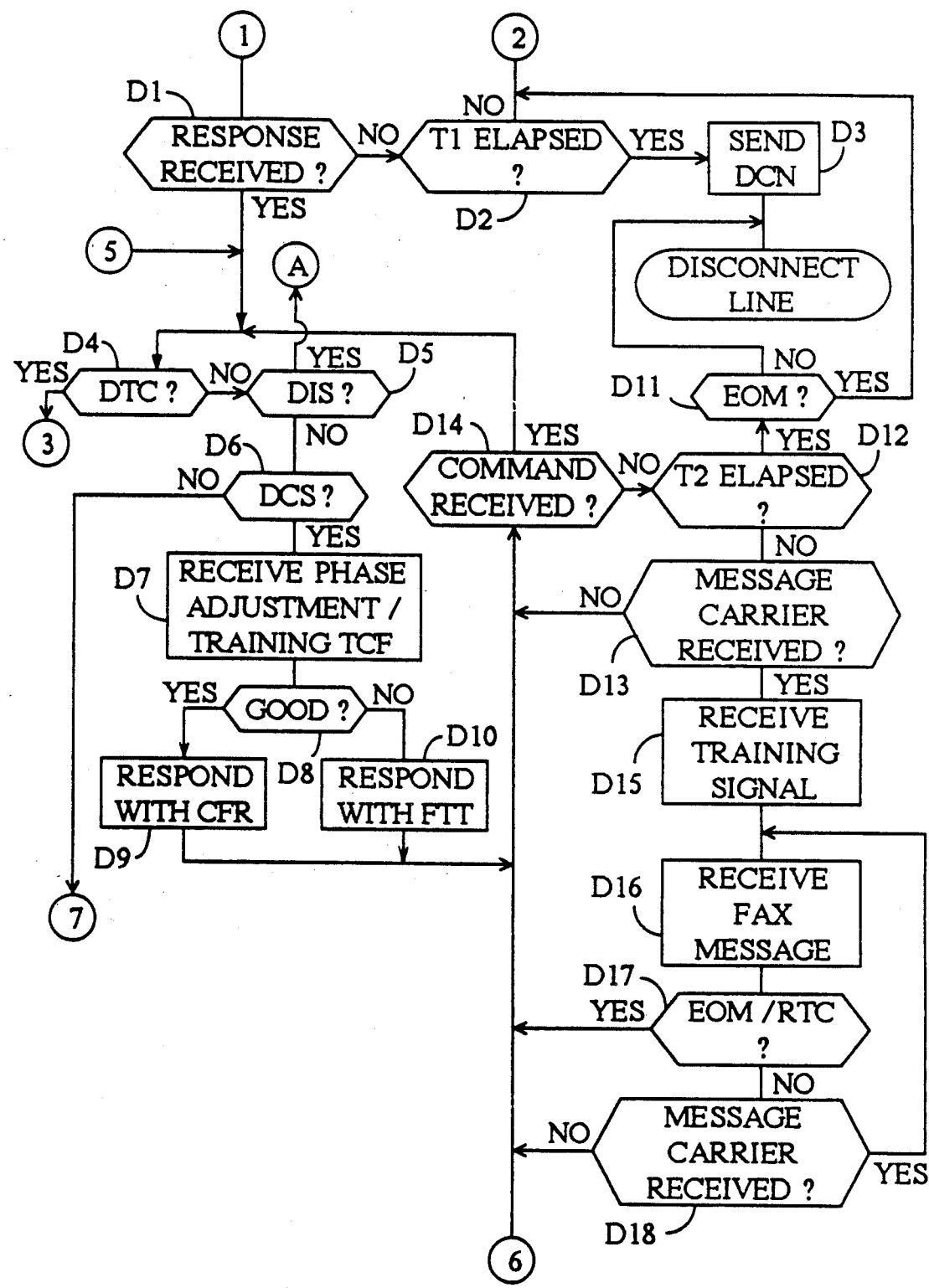
Figure 11E:
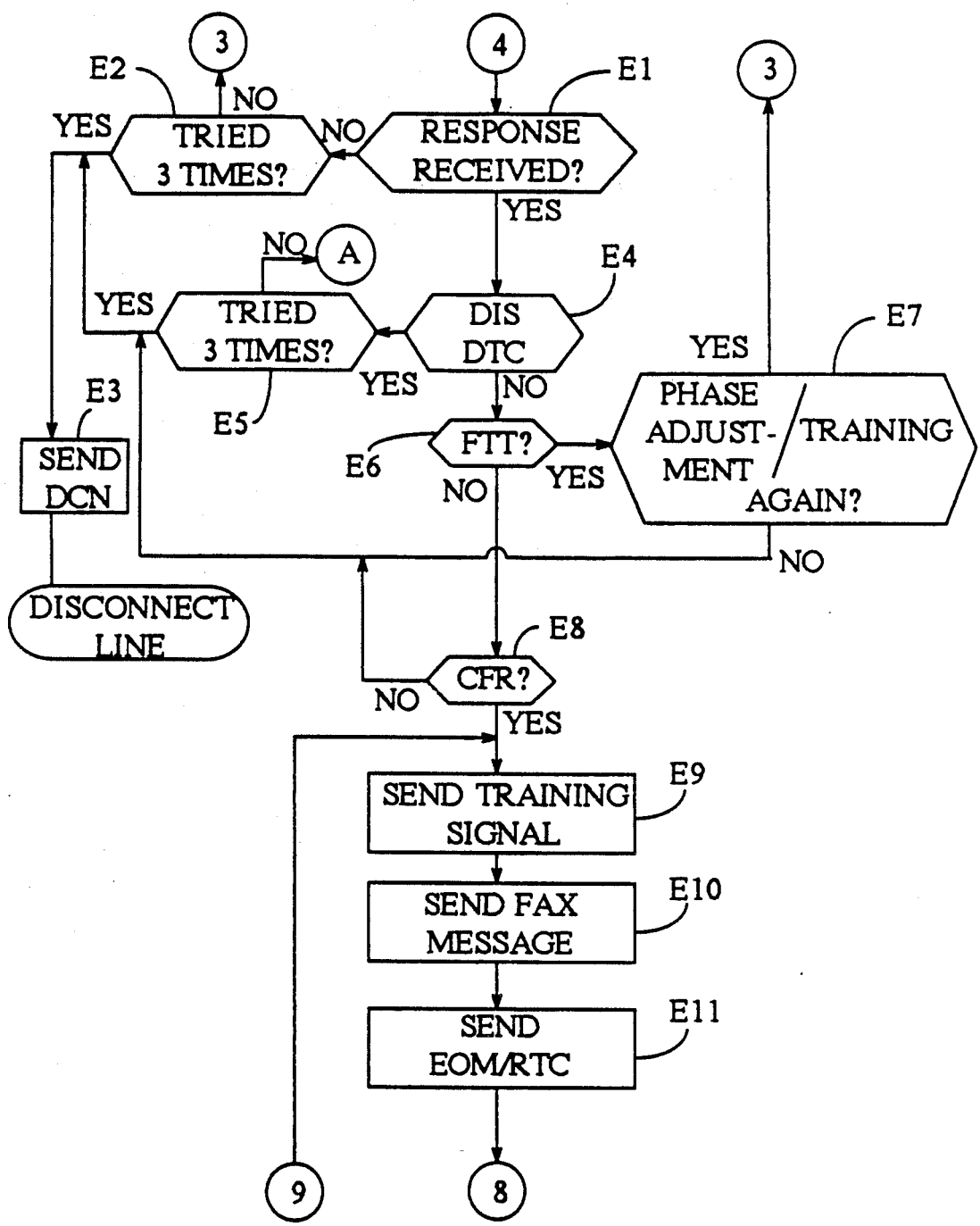
Figure 11F:
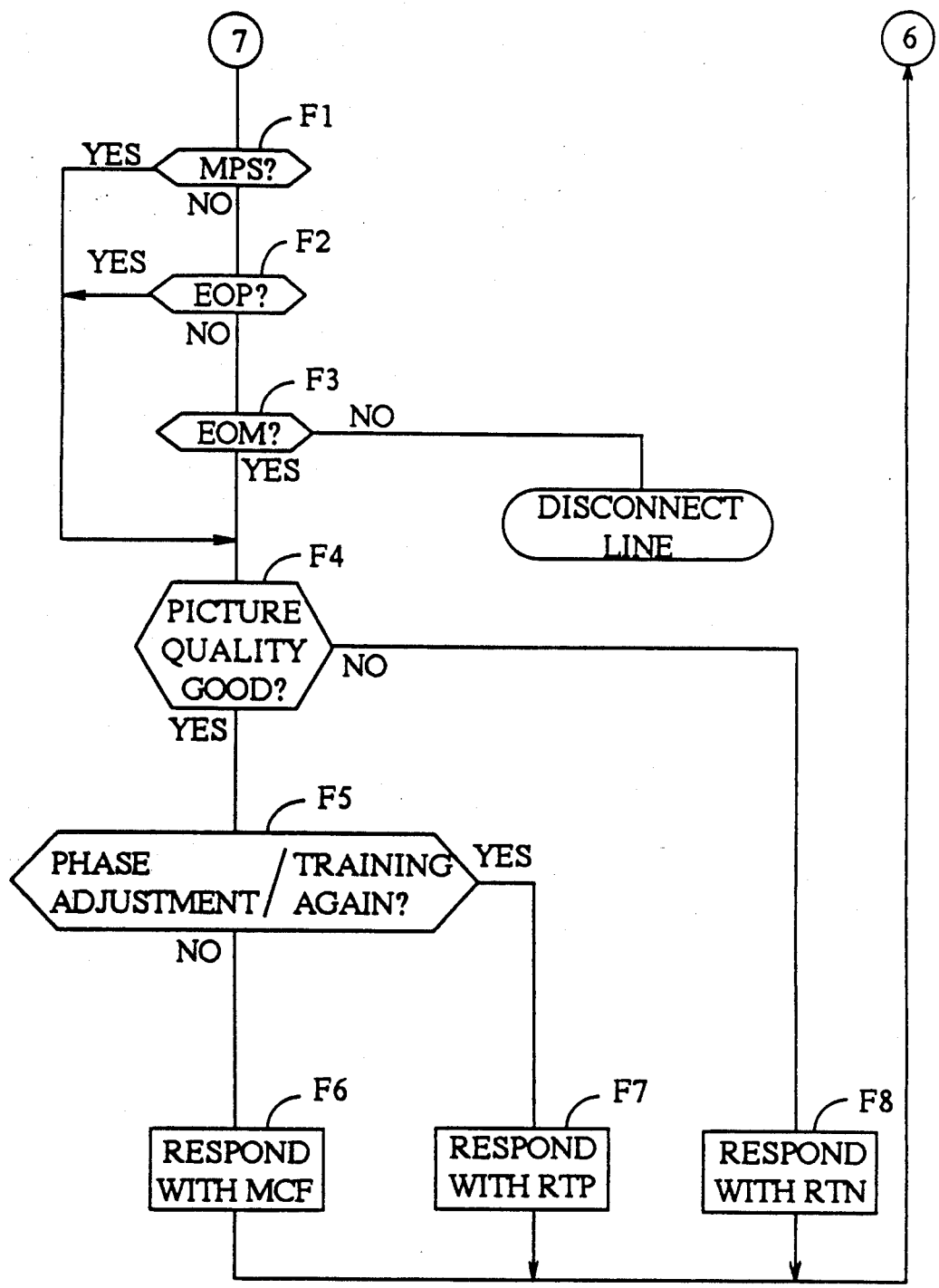
Figure 11G:
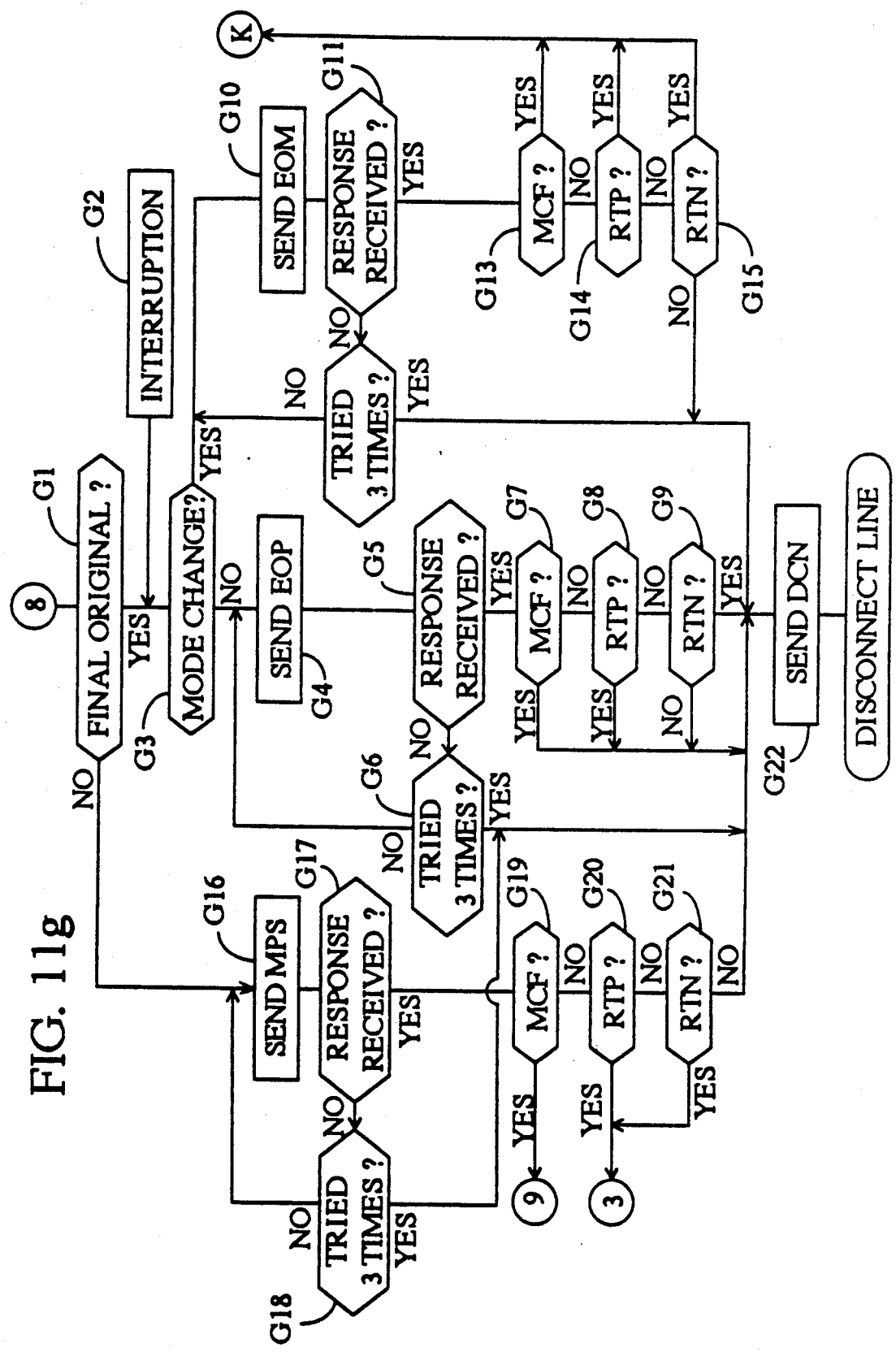

At the calling facsimile equipment, with the hookswitch turned off, (corresponding to the operation of lifting the telephone receiver), the user dials the number of the desired remote facsimile equipment upon detecting a dial tone from the exchanger (see FIG. 11a).

At the called end, when a ringing tone from the exchanger is detected, the hook-switch is turned off and a called end discrimination signal (CED) which indicates that the called end is a facsimile equipment is sent to the telephone lines. Until this signal (CED) is detected, the calling end continues sending to the telephone lines a calling tone (CNG) which indicates that the calling end is a facsimile equipment.

At the calling end, after the signal (CED) has been detected, the facsimile communication mode is entered. At the called end, after the signal (CED) has been sent, a digital discrimination signal (DIS) is sent which indicates that the called equipment has a standard capability specified by CCITT. More specifically, the called end informs the calling end by sending the signal (DIS) which communication mode (G1, G2, G3, etc.) is available at the called facsimile equipment.

At the calling end, it is judged, on the basis of the contents of the digital discrimination signal (DIS) sent from the called end, whether or not the communication capability of the remote facsimile equipment is conformable to that of the local facsimile equipment, and a communication mode which is conformable to the communication capabilities of the two facsimile equipments is determined. Then, a digital command signal (DCS) which responds to the signal (DIS) is sent back to the called end. Subsequently, a training check signal (TCF) is sent to the called end for checking the condition of the telephone lines. At the called end, after the reception of the signal (DCS), the signal (TCF) is received in a designated mode and a signal (CFR or FTT) representative of the result of the reception is sent back to the calling end.

At the calling end, if the communication condition is judged to be good from the reception result sent back, the control process proceeds to the next message transmission step, whereas, if the communication condition is judged to be no good, the communication mode is changed (in general, the transmission speed is lowered) and the signal (TCF) is sent to the called end again in this communication mode.

When receiving the signal (CFR), the calling end sends a training signal to the called end to synchronize it with the calling end and subsequently transmits messages. After being synchronized with the calling end by means of the training signal, the called end receives the transmitted messages.

The called end continues reception until it detects a signal (RTC) sent from the calling end to indicate the end of transmission of information corresponding to one page of the subject original.

Upon completion of transmission of information corresponding to one page of the original, the calling end detects whether or not it is the last page of the original. If NO, after sending a multipage signal (MPS), the calling end receives either a reception confirming signal (MCF) or a re-training signal (RTP, RTN) sent from the receiving end and determines whether to change the transmission mode, send the training signal or cut off the telephone lines on the basis of the signal received.

If the transmitted information corresponds to the last page of the subject original, the control procedure is interrupted by an interrupt to determine whether to change the mode or not. If it is determined to change the mode, after sending a procedure end signal (EOP), the calling end enters into a line cut-off operation. If it is determined not to change the mode, the calling end stands by until it receives a digital discrimination signal (DIS) after receiving any one of the signals (MCF), (RTP) and (RTN).

When receiving any one of the signals (MPS), (EOP) and (EOM: message end signal), the called end responds with any one of the signals (MCF), (RTP) and (RTN) and returns to the command reception state. On any other occasions, the called end enters into a line cut-off operation.

The operation of the secret communication control apparatus will next be explained.

First of all, it is judged whether the local facsimile equipment belongs to the calling end or the called end. More specifically, an incoming call signal which is outputted from the call detecting circuit 220 is checked in Step A52 shown in FIG. 12a and a hook signal which is outputted from the polarity detecting circuit 210 is checked in Step A55 to judge which one of the two, that is, an incoming call signal and a hook-off state, was detected earlier than the other, thereby detecting whether the local facsimile equipment belongs to the calling end or the called end. If the local facsimile equipment belongs to the called end, an incoming call signal is first detected; therefore, 1 is stored in the register $C_1$ in Step A53. If the local facsimile equipment belongs to the calling end, a hook-off state is detected in a state where no incoming call signal has been detected and 0 has therefore been stored in the register $C_1$ in Step A54, and the process then proceeds to the next processing. Accordingly, in the following processings, it is possible to judge whether the local facsimile equipment belongs to the calling end or the called end by referring to the register $C_1$.

Next, it is judged in Step A58 whether or not the memory card 130 has been inserted in the secret communication control apparatus. This can be done by referring to a card set signal CST which is outputted from the memory card 130. When the memory card 130 is inserted in at least one of the secret communication control apparatuses provided at the calling and called ends, it is considered that the user will perform secret communication.

When the memory card 130 is set, the process proceeds to Step A59 where the relay RY1 is turned on to set a condition where the condition of the public telephone lines LN1 and LN2 can be monitored through the modem 400. In Step A60, the value of the register $C_1$ is checked, and the process then proceeds to either the processing for the calling end or the processing for the called end in accordance with the value of the register $C_1$.

When the local facsimile equipment belongs to the called end, the switch (FAX-SW: SW1) is checked in Step A69 as to whether the local facsimile equipment is set in the manual or automatic mode. If it is set in the manual mode, the process proceeds to Step A70, in which the relay RY2 is turned on to connect the lines LF1 and LF2 of the local facsimile equipment to the internal lines LiB provided in the associated secret communication control apparatus. As a result, the secret communication control apparatus intervenes in the communication lines between the local and remote facsimile equipments, so that the local and remote facsimile equipments cannot communicate directly with each other and all signals are transmitted via the secret communication control apparatus.

In Step A71, a signal (CED) is sent to the remote end, that is, the calling station, through the modem 400.

Figure 12A:
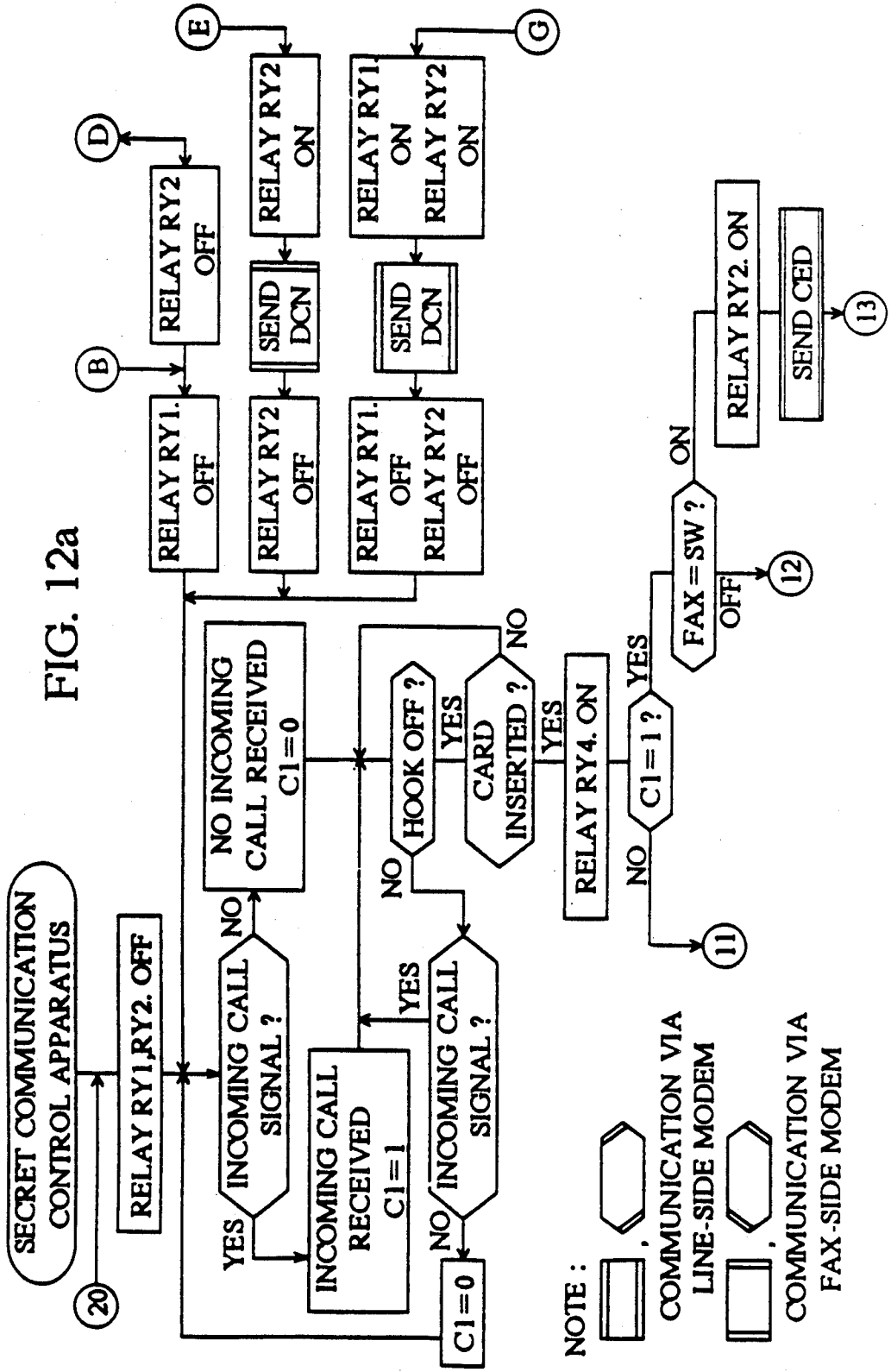
FIGS. 12a to 12i are flowcharts showing the operations of the secret communication control apparatus.
Figure 12B:
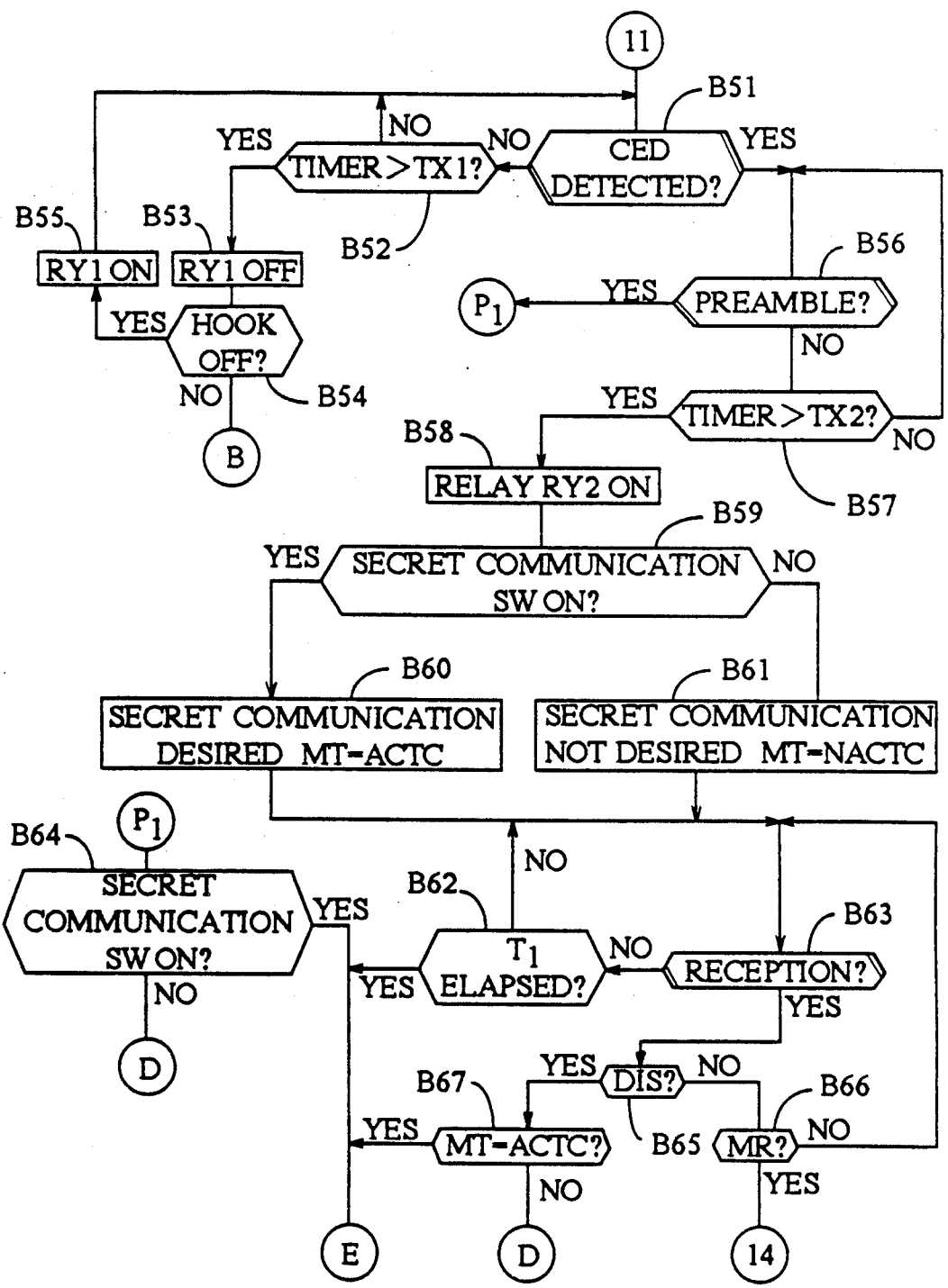
Figure 12C:
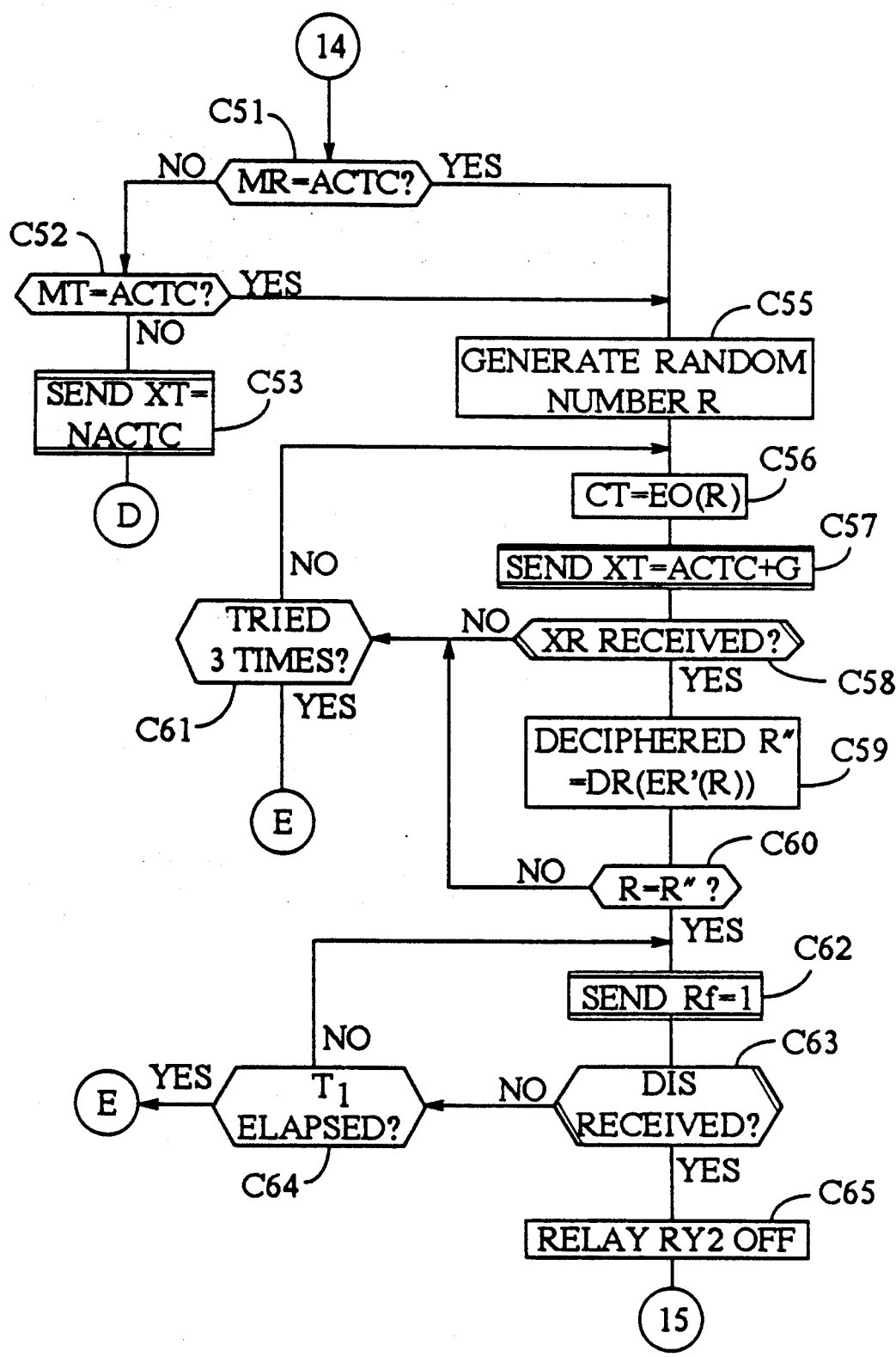
Figure 12D:
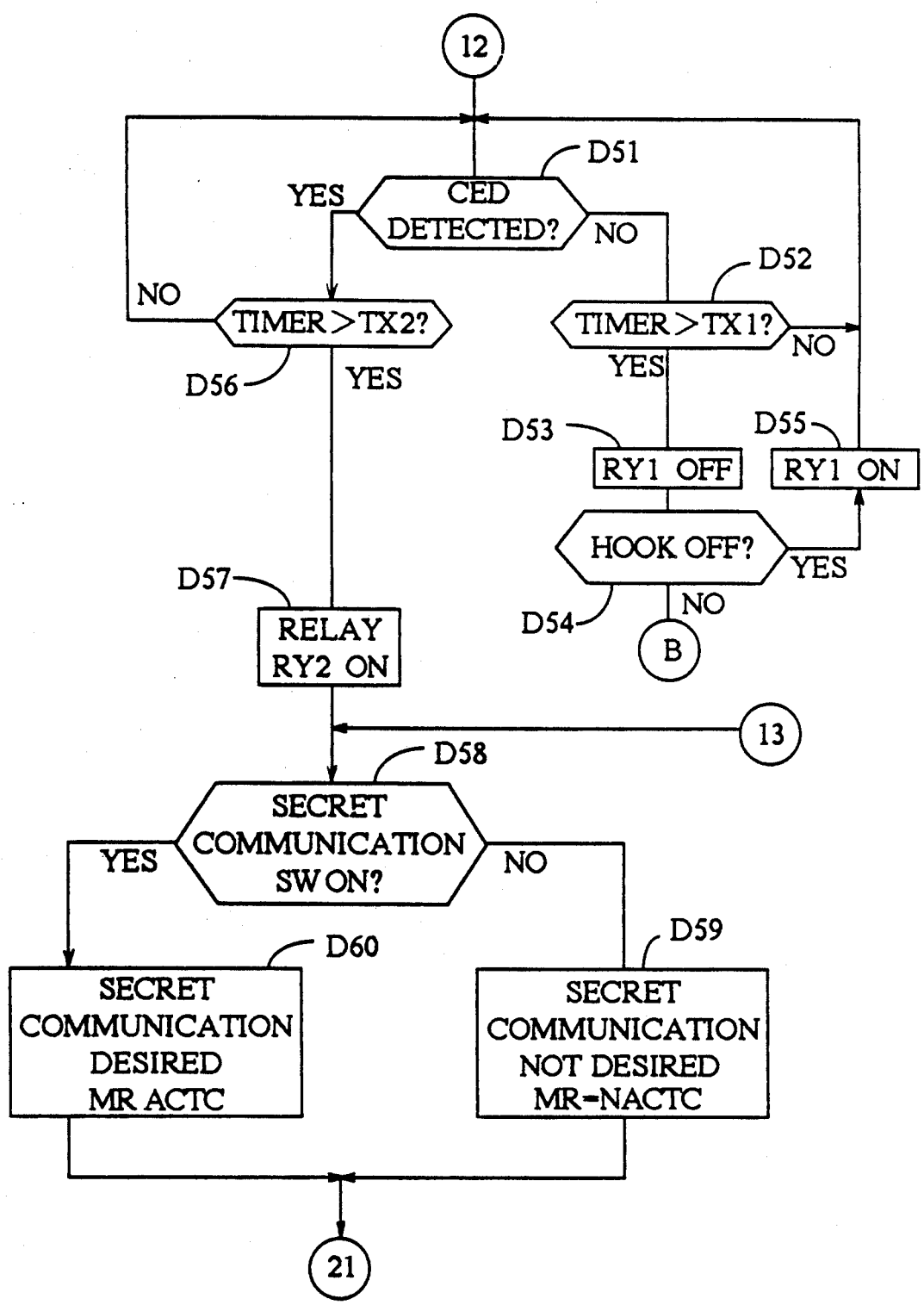

If the local facsimile equipment is set in the automatic mode, the process proceeds to Step D51 shown in FIG. 12d. When a signal (CED) outputted from the local facsimile equipment is detected in Step D51, the relay RY2 is turned on after a predetermined time $Tx_2$ has elapsed after the detection of the signal (CED), thereby connecting the lines LF1 and LF2 of the local facsimile equipment to the internal lines LiB provided in the associated secret communication control apparatus. As a result, the secret communication control apparatus intervenes in the communication lines between the local and remote facsimile equipments, so that the local and remote facsimile equipments cannot communicate directly with each other and all signals are transmitted via the secret communication control apparatus.

Next, the state of the secret communication switch (SW2) is checked. If the switch is on, it is considered that secret communication is desired, and the code ACTC is stored in the register Mr, whereas, if the switch is off, the code NACTC is stored in the register Mr.

Figure 12E:
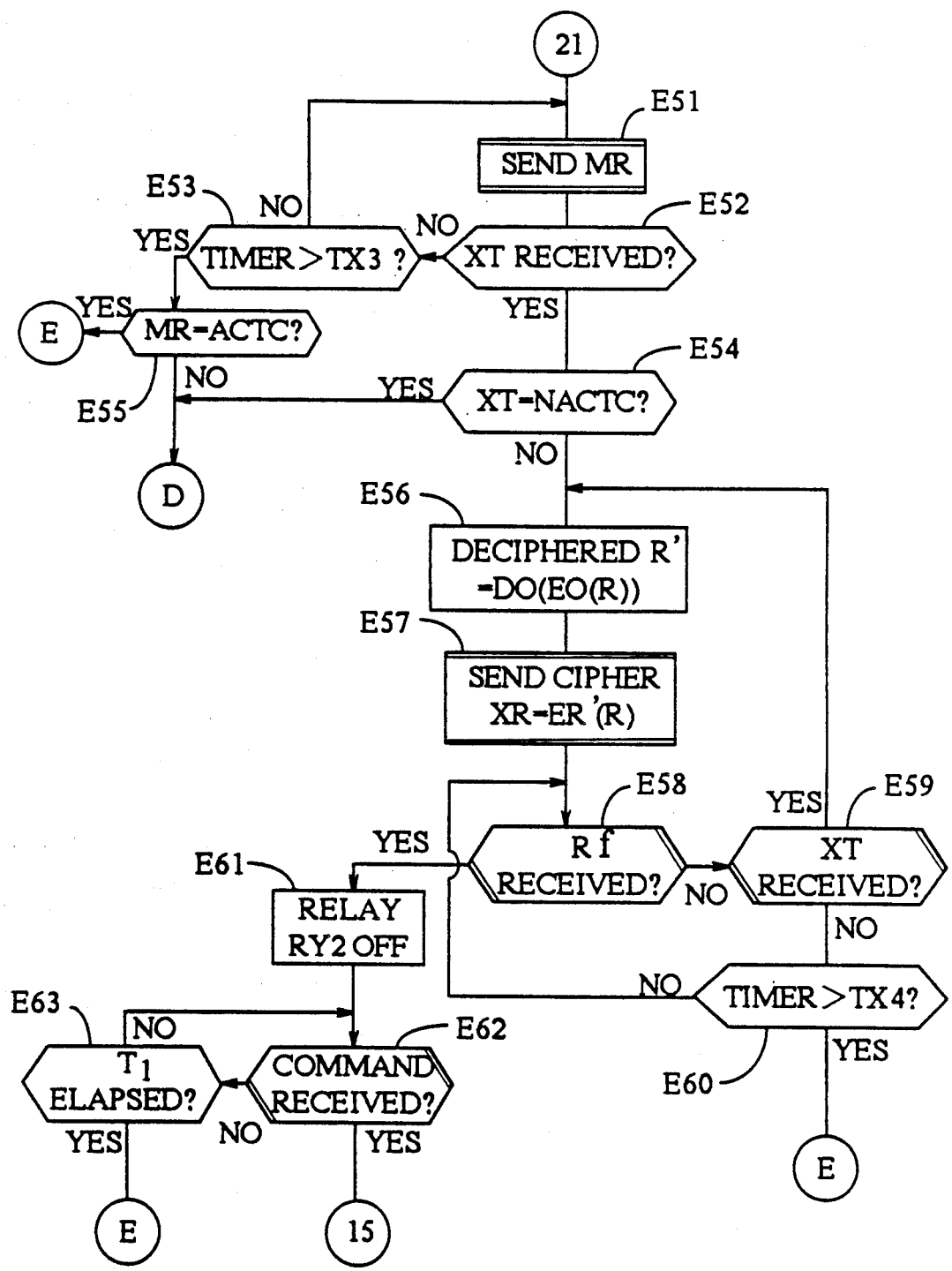

Next, the process proceeds to Step E51 shown in FIG. 12e, in which the content of the register Mr is sent to the remote station.

In the case where the local station is the calling end, the process proceeds to Step B51 shown in FIG. 12b, in which detection of a signal (CED) is awaited. When the signal is detected, the process proceeds to Step B56. If the called station is an ordinary facsimile equipment, either the signal (DIS) or (DTC) is sent at this time, but if the secret communication control apparatus provided at the called station is in an operative state, the content of the register Mr is sent in Step E51 shown in FIG. 12e in place of the signal (DIS) or (DTC) following the signal (CED). In this case, when a predetermined time $Tx_2$ has elapsed, the process proceeds from the Step B57 to Step B58, in which the relay RY2 is turned on to change the connection of the lines. In Step B59, the state of the secret communication switch (SW2) is judged, and the content of the register Mt is set in accordance with the result of the judgement. When the content of the register Mr is consequently received, the process proceeds from Step B66 to Step C51 shown in FIG. 12c. If either the register Mr or Mt has the code ACTC stored therein, that is, if it is judged that secret communication is desired, the process proceeds to Step C55.

In Step C55, the level of the signal RDM outputted from the random number generator is repeatedly sampled to thereby produce a random number code R. In Step C56, the random number code R thus produced is applied to the encryption/decryption processing circuit 600 as being an input X and the ID code which is obtained from the memory card 130 is also applied to the encryption/decryption processing circuit 600 to form key codes KA and KB, thereby producing information Ct enciphered from the random number code R. In the next Step C57, information Xt comprising the code ACTC having the cipher Ct added thereto is sent to the called station.

At the called station, the information Xt from the calling station is received in Step E52 shown in FIG. 12e. If the information Xt is not the code NACTC, the process proceeds to Step E56, in which the ID code obtained from the memory card 130 at the called station is applied to the encryption/decryption processing circuit 600 as being a master key to produce key codes KA and KB corresponding to the master key. Then, the received cipher is applied to the encryption/decryption processing circuit 600 as being cipher input Y to decipher this cipher. The deciphered information R' is outputted to the data bus. In the next Step E57, the deciphered information R' is applied to the encryption/decryption processing circuit 600 as being a master key to produce key codes KA and KB corresponding to this master key. Then, the information R' is applied to the encryption/decryption processing circuit 600 as being input information X to encipher it, and the resulting cipher Xr is sent to the calling station.

At the calling station, when the cipher Xr is received in Step C58, the process proceeds to Step C59. In Step C59, the cipher Xr is applied to the encryption/decryption processing circuit 600 as being cipher input Y and the value that is identical to the random number first sent is also applied to the encryption/decryption processing circuit 600 as being a master key, to thereby decipher the cipher Xr. The information R'' deciphered in this way is expressed as follows:

$$R''=Dr(Er'(R')) \tag{1}$$

where
R': R deciphered at the called end
Er': encryption function used at the called end
Dr: decryption function used at the calling end Accordingly, when all the encryption and decryption conditions at the calling and called ends are coincident with each other, the deciphered information R'' is equal to the random number code R first sent. If the ID codes respectively stored in the memory cards at the calling and called ends are different from each other, R and R'' are not coincident with each other. At the calling end, R and R'' are compared with each other in Step C60, and if they are coincident with each other, the process proceeds to Step C62, in which 1 is stored into the register Rf and the content of the register Rf is sent to the called end. If R and R'' are not coincident with each other, sending of the cipher and comparison between the cipher sent and the cipher sent back are repeated 3 times. If no coincidence is obtained even in the third comparison, the operation for secret communication is prohibited.

At the called end, when the content of the register Rf is received in Step E58 shown in FIG. 12e, the process proceeds to Step E61, in which the relay RY2 is turned off. Thus, the intervention of the secret communication control apparatus in the communication lines is canceled and the facsimile equipment at the called station is connected directly to the public telephone lines LN1 and LN2.

At this time, the facsimile equipment at the called end continues sending the digital discrimination signal (DIS), while the facsimile equipment at the calling end is waiting for this signal. As a result of the execution of Step E61, the signal (DIS) from the called station is outputted from the public telephone lines LN1 and LN2, and it is detected by the secret communication control apparatus at the calling station in Step C63 shown in FIG. 12c.

When detecting the signal (DIS) in Step C63, the secret communication control apparatus at the calling station turns off the relay RY2 in Step C65. Thus, the intervention of the secret communication control apparatus at the calling station in the communication lines is canceled, and the facsimile equipment at the calling station is connected directly to the public telephone lines LN1 and LN2.

More specifically, upon completion of the delivery of the key for secret communiation between the calling and called stations, each of the secret communication control apparatuses at the calling and called stations enters into a mere line monitoring state. Thus, the facsimile equipments at the calling and called stations are connected directly through the public telephone lines LN1 and LN2, with no secret communication control apparatus intervening therebetween.

Accordingly, delivery of signals is effected thereafter between the facsimile equipments at the calling and called ends according to the same communication control procedures as in the case of ordinary communication between facsimile equipments until the relay RY2 of the secret communication control apparatus turns on again. In the meantime, each of secret communication control apparatuses at the calling and called ends monitors the contents of signals appearing on the public telephone lines LN1 and LN2.

The secret communication control apparatus at the calling end awaits the local facsimile equipment to send the signal (DIS) in Step E62. When the signal (DIS) is detected, the process proceeds to Step F51 shown in FIG. 12f. The secret communication control apparatus at the called end also executes Step F51 after executing Step C65 shown in FIG. 12c.

Figure 12F:
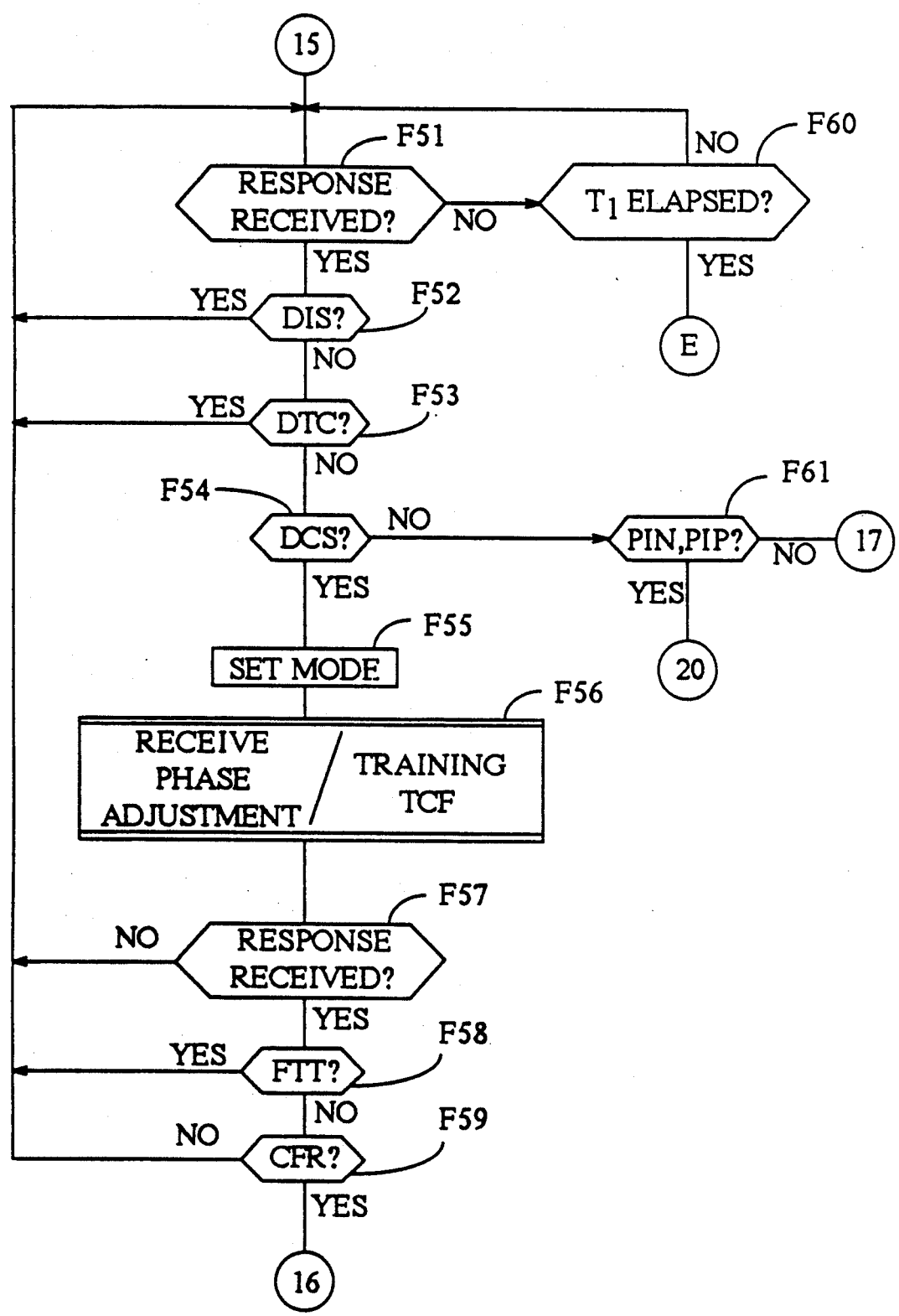
Figure 12G:
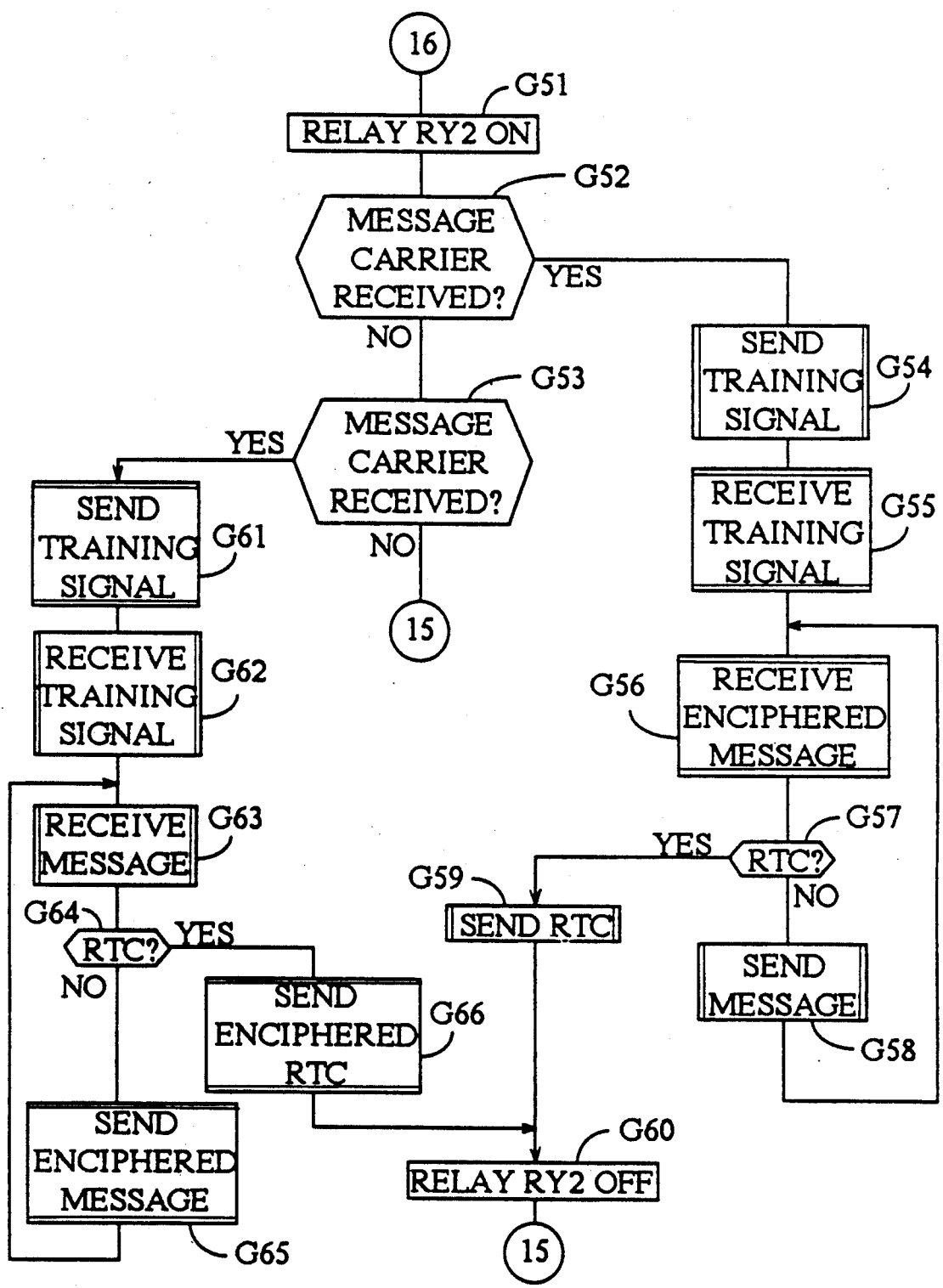
Figure 12H:
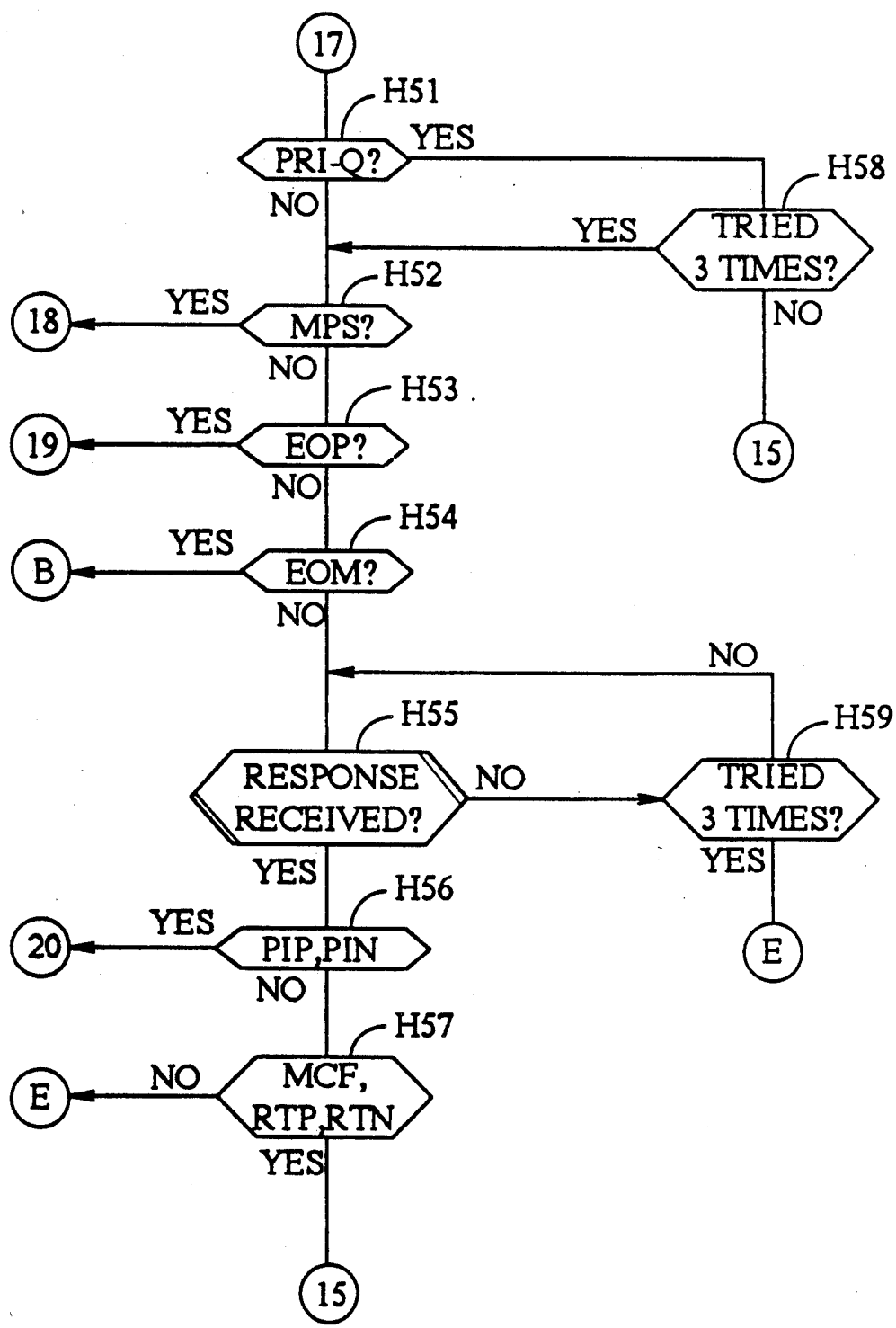
Figure 12I:
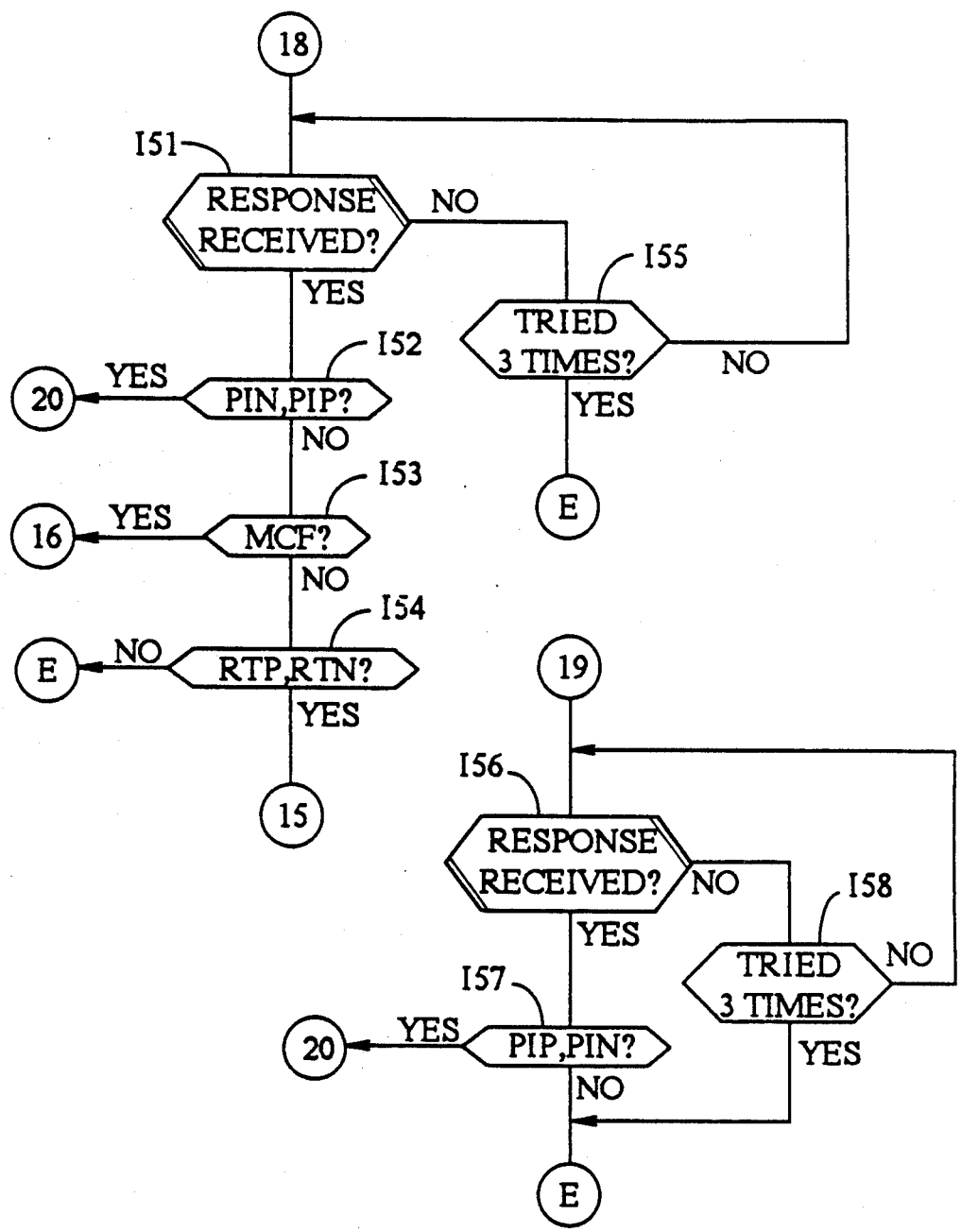

The processing shown in FIG. 12f is a monitoring processing corresponding to the communication procedure of phase B effected between facsimile equipments, which is based on CCITT T30.

When a response is received in Step F51, the process proceeds to a processing executed in accordance with the contents of the data received. If the received data is the signal (DCS), mode setting processing is executed in Step F55, and phase adjustment and reception of a training signal are carried out in the subsequent Step F56. Further, a response to the training signal is monitored in Step F57. When the result of the tranining is good, that is, when the signal (CFR) is deteced in Step F59, the process proceeds to Step G51 shown in FIG. 12g.

Upon completion of the foregoing communication procedures, preparations for message transmission are completed. In Step G51, therefore, the relay RY2 is turned on again to connect the lines LF1 and LF2 of the local facsimile equipment to the internal lines LiB in the associated secret communication control apparatus. Thus, the secret communication control apparatus intervenes between the local facsimile equipment and the remote station again. At this tine, both the two modems 300 and 400 are set in the V.27ter receiving mode. The secret communication control apparatus then monitors the conditions of both the public telephone lines LN1, LN2 and the facsimile lines LF1, LF2.

When the local facsimile equipment is the receiving station, picture data appears on the public telephone lines LN1 and LN2; therefore, a message carrier is detected in Step G52 and the process then proceeds to Step G54. When the local facsimile equipment is the sending station, picture data appears on the lines LF1 and LF2; therefore, a message carrier is detected in Step G53 and the process then proceeds to Step G61.

More specifically, each of the local and remote stations is automatically judged to be the sending station or the receiving station by checking whether a message carrier is detected on the public telephone lines LN1, LN2 or the lines LF1, LF2.

After this judgement has been completed, the operating mode for each modem is set again. More specifically, if the local station is the sending station, the facsimile-side modem 300 is left in the V.27ter receiving mode, while the operating mode of the line-side modem 400 is changed to the V.27ter transmitting mode. If the local station is the receiving station, the operating mode of the facsimile-side modem 300 is changed to the V.27ter transmitting mode, while the line-side modem 400 is left in the V.27ter receiving mode. Thus, the contents of communication can be relayed via the secret communication control apparatus irrespective of whether the local station is the receiving station or the sending station.

When the local station is the receiving station, training of communication is executed and synchronization is checked in Steps G54 and G55. In Step G56, the enciphered message (picture data) that is received by the modem 400 connected to the public telephone lines LN1 and LN2 is deciphered through the encryption/decryption processing circuit 600. If the deciphered data is not the signal (RTC) that indicate the end of transmission of information corresponding to one page of the subject original, the process proceeds to Step G58, in which the picture data is outputted to the internal lines LiB through the modem 300 and thereby transferred to the local facsimile equipment.

Until there is no more message received, that is, until the signal (RTC) is detected, the processings of Steps G56 and G58 are repeated to relay the received message while deciphering it. When the signal (RTC) is detected, the process proceeds to Step G59, in which the signal (RTC) is sent to the local facsimile equipment, and the relay RY2 is then turned off in the subsequent Step G60.

When the local station is the sending station, training of communication is executed and synchronization is checked in Steps G61 and G62. In Step G63, data from the local facsimile equipment is received by the modem 300 connected to the lines LF1 and LF2. If the received data is a message (picture data), the message is enciphered through the encryption/decryption processing circuit 600, and the enciphered message is outputted to the public telephone lines LN1 and LN2 through the modem 400 and thereby transferred to the secret communication control apparatus provided at the remote station.

Until there is no more message received, that is, until the signal (RTC) is detected, the processings of Steps G63 and G65 are repeated to relay the received message while enciphering it. When the signal (RTC) is detected, the process proceeds to Step G66, in which the signal (RTC) is enciphered and sent to the secret communication control apparatus at the remote station, and the relay RY2 is then turned off in the subsequent Step G60.

By executing Step G60, the intervention of the secret communication control apparatus in the communication is canceled and the facsimile equipment is connected directly to the public telephone liens LN1 and LN2. At this time, the secret communication control apparatus merely monitors the condition of the public telephone lines LN1 and LN2. More specifically, it executes the monitoring of the communication control procedure of phase B shown in FIG. 12f again. The secret communication control apparatus also executes the processing (the communication control procedure of phase D based upon CCITT T30) shown in FIGS. 12h and 12i. When detecting the signal (CFR), the secret communication control apparatus executes the processing shown in FIG. 12g again, in which it turns on the relay RY2 and thus intervenes in the communication to relay messages transmitted.

More specifically, in this embodiment secret communication is enabled by intervention of the secret communication control apparatus between the public telephone lines LN1, LN2 and the facsimile equipment, but the secret communication control apparatus actually intervenes in the communication only when the key is delivered and message data (picture data) is transmitted or received. With regard to exchange of signals related to other communication control procedures, communication is effected directly between two facsimile equipments and, at this time, the secret communication control apparatus is merely in a line monitoring state.

When the secret communication control apparatus intervenes in communication, it is necessary to perform communication between the facsimile equipment and secret communication control apparatus at the sending station, between the secret communication control apparatuses at the sending and receiving stations, and between the secret communication control apparatus and facsimile equipment at the receiving station. Accordingly, when a simple intervention processing is carried out, the time required for the communication is three times that in the case where communication is performed directly between two facsimile equipments. In this embodiment, however, when message data is transmitted, reception and transmission are substantially simultaneously executed in the two secret communication control apparatuses; therefore, with regard to message data there is no fear that the time required for communication will lengthen. Moreover, when transmission of information other than key and message data is performed, the intervention of the secret communication control apparatus in the communication is temporarily canceled; therefore, in such a case also there is no fear that the time required for communication will lengthen. Accordingly it is possible to perform secret communication in a period of time equal to that in the case of ordinary facsimile communication.

Although in the foregoing embodiment encryption and decryption are effected by arithmetic addition and exclusive-OR operation, it should be noted that the present invention may be carried out by use of various other cryptographic methods which have heretofore been known. For example, it is possible to employ a method wherein the value of the key is renewed one after another by counting up said value, as in the case of stream cryptography. It is also possible to employ a method that utilizes data immediately before encryption as a key.

Although in the foregoing embodiment the present invention has been described by way of one example in which secret communication is performed between two facsimile equipments, the present invention may be applied not only to facsimile equipments but also to other communication equipments which perform communication according to the same communication procedures.

As has been described above, the present invention enables secret communication control apparatuses to be provided in such a manner as to intervene in the communication lines of exsiting communication means. It is therefore possible to utilize the majority of existing communication means as those for secret communication without the need for a special modification or change in design. Moreover, it is possible to minimize the time required for secret communication and make it closer to the time required for ordinary, nonsecret communication. Thus, practical secret communication is realized.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A secret communication control apparatus comprising:

a first set of signal lines connected to remote communication means;

first modulator-demodulator means connected to said first set of signal lines for demodulating a signal appearing on said signal lines and modulating a signal applied to a modulation input terminal and outputting the modulated signal to said signal lines;

a second set of signal lines connected to local communication means;

a third set of signal lines;

second modulator-demodulator means connected to said third set of signal lines for demodulating a signal appearing on said third set of signal lines and modulating a signal applied to a modulation input terminal and outputting the modulated signal to said third set of signal lines;

secret information processing means for deciphering the signal demodulated by said first modulator-demodulator means and applying the deciphered signal to the modulation input terminal of said second modulator-demodulator means and further enciphering the signal demodulated by said second modulator-demodulator means and applying the enciphered signal to the modulation input terminal of said first modulator-demodulator means;

change-over switching means for selectively connecting said second set of signal lines to either one of said first and third sets of signal lines; and electronic control means for monitoring signals appearing on said first or second set of signal lines and effecting control such that, when at least key information and message information are to be transmitted, said control means sets said change-over switching means in a first position for intervention in the communication between said first and second sets of signal lines, whereas, when at least a communication control code which is utilized to set a communication mode is to be transmitted, said control means sets said change-over switching means in a second position for suspending the intervention in the communication between said first and second sets of signal lines.

2. A secret communication control apparatus according to claim 1, wherein, when detecting signals for premessage and postmessage procedures, said electronic control means sets said change-over switching means in said second position, whereas, when detecting a reception preparation confirming signal, said control means sets said change-over switching means in said first position.

3. A secret communication control apparatus according to claim 1, wherein, when said control apparatus intervenes in the communication between said first and second sets of signal lines, said electronic control means judges whether a message signal appears on said first set of signal lines or said second set of signal lines, and changes over the signal input/output directions with respect to said first and second sets of signal lines in accordance with the result of the judgement.

* * * * *